United States Patent
Kapoor

(10) Patent No.: US 11,340,923 B1
(45) Date of Patent: May 24, 2022

(54) HEURISTIC-BASED MESSAGING GENERATION AND TESTING SYSTEM AND METHOD

(71) Applicant: Newristics LLC, Scottsdale, AZ (US)

(72) Inventor: Gaurav Kapoor, Wilton, CT (US)

(73) Assignee: NEWRISTICS LLC, Scottsdale, AZ (US)

( * ) Notice: Subject to any disclaimer, the term of this patent is extended or adjusted under 35 U.S.C. 154(b) by 181 days.

(21) Appl. No.: 16/885,161

(22) Filed: May 27, 2020

Related U.S. Application Data

(63) Continuation-in-part of application No. 16/732,885, filed on Jan. 2, 2020, now abandoned.

(60) Provisional application No. 62/787,565, filed on Jan. 2, 2019.

(51) Int. Cl.
| | |
|---|---|
| *G06Q 30/02* | (2012.01) |
| *G06F 9/451* | (2018.01) |
| *G10L 15/22* | (2006.01) |
| *G06F 8/71* | (2018.01) |
| *G06F 40/58* | (2020.01) |

(52) U.S. Cl.
CPC .......... *G06F 9/454* (2018.02); *G06F 8/71* (2013.01); *G06F 40/58* (2020.01); *G06Q 30/02* (2013.01); *G10L 15/22* (2013.01)

(58) Field of Classification Search
CPC ........................................................ G06Q 30/02
See application file for complete search history.

(56) References Cited

U.S. PATENT DOCUMENTS

| | | | | |
|---|---|---|---|---|
| 2002/0184075 | A1* | 12/2002 | Hertz | G06Q 30/0256 705/7.33 |
| 2008/0004955 | A1* | 1/2008 | Mathew | G06Q 30/0251 705/14.52 |
| 2008/0046317 | A1* | 2/2008 | Christianson | G06Q 30/0277 705/14.44 |
| 2009/0292588 | A1* | 11/2009 | Duzevik | G06N 3/126 705/7.29 |

(Continued)

OTHER PUBLICATIONS

Newristics, "Do you spend time on heuristic psychology", https://newristics.com, archived on Aug. 22, 2018. Retrieved from "archive.org" (Year: 2018).*

(Continued)

*Primary Examiner* — Jialong He
(74) *Attorney, Agent, or Firm* — Leason Ellis LLP

(57) ABSTRACT

A plurality of messages are received and for each respective one of the received plurality of messages: a series of steps can be performed, including identifying language in the respective message, determining at least one heuristic, generating a first modified version of the respective message and generating at least one second modified version of the respective message. The second modified version(s) include language not in the respective message and not in the first modified version of the respective message. Further the at least one second modified version represents the determined at least one other heuristic. A device can be prompted to respond to a survey that includes the respective message(s), at least one first modified version, and/or at least one second modified version. A second survey can be generated of the respective message(s), modified version(s), and/or second modified version(s).

16 Claims, 18 Drawing Sheets

(56) References Cited

U.S. PATENT DOCUMENTS

2009/0306967 A1* 12/2009 Nicolov ................ G06F 40/30
  704/9
2011/0191141 A1* 8/2011 Thompson ......... G06Q 30/0202
  705/7.32

OTHER PUBLICATIONS

Six Degree, "5 ways in which heuristics can impact market research", published on website "https://www.six-degrees.com/", Jun. 8, 2017, (Year: 2017).*

Tracy Vides, "How to use heuristics to Ace your email marketing", retrieved from Archive.org, archive date: Jun. 22, 2017. (Year: 2017).*

* cited by examiner

Research Inputs

| Attribute | Number | Message |
|---|---|---|
| Cover/Summary | | Show 1 |
| Study Design | | Show 1 |
| TMB | | Show 0-1 |
| Efficacy - PFS | | Show 1 |
| Efficacy - PFS Visual | | Show 0-1 |
| Efficacy – ORR | | Show 0-1 |
| Efficacy – ORR Visual | | Show 0-1 |
| Efficacy – DOR | | Show 0-1 |
| Efficacy DOR Visual | | Show 0-1 |
| Efficacy (PFS by PD-L1) | | Show 0-1 |
| Efficacy (PFS by PD-L1) Visual | | Show 0-1 |
| Dosing | | Show 1 |
| Safety | | Show 1-2 |
| Heritage | | Show 0-1 |

- 50 Messages were tested across 10 attributes
- 4 Visuals were also tested
- Longest bundle possible had 11 messages
- Shortest bundle possible had 8 messages
- A "heuristicized" alternative was also tested for almost every one of the 50 messages.

*Example:*

| | |
|---|---|
| Original | The possibility of dual immunotherapy: OPDIVO + YERVOY more than tripled 1-year PFS (43% vs 13%). |
| Heuristicized | Dual immunotherapy raises the bar: 1-year PFS more than tripled (43% vs 13%) when patients received OPDIVO + YERVOY. |

FIG. 6

Optimal Storyflow Preference Share

- Based on the optimal storyflow, O+Y gets a 55% preference share vs. Keytruda's 45%
- Keytruda's message storyflow tested had only 7 messages while O+Y optimal storyflow has 11 messages.

O+Y Optimal Message Storyflow
Number of messages = 11

Keytruda Message Storyflow Tested
Number of messages = 7

Preference share: 55%

Preference share: 45%

Q: Based on the two descriptions presented below, which treatment option motivates you *more* to prescribe it as first line therapy in the treatment of mNSCLC in patients with high TMB (≥10 mut/Mb)?

FIG. 7

HEURISTIC-BASED MESSAGING GENERATION AND TESTING SYSTEM AND METHOD

CROSS-REFERENCE TO RELATED PATENT APPLICATION

This application is a continuation-in-part and is based on and claims priority to U.S. Non-Provisional patent application Ser. No. 16/732,885, entitled HEURISTIC-BASED MESSAGING TESTING SYSTEM AND METHOD, filed Jan. 2, 2020, which is based on and claims priority to U.S. Provisional Patent Application 62/787,565, filed Jan. 2, 2019, the entire contents of each of which is incorporated by reference herein as if expressly set forth in its respective entirety herein.

FIELD OF THE INVENTION

The present disclosure, generally, pertains to message testing and, more particularly, to a selective, quantitative research methodology that includes generation and testing of messages and message bundles.

BACKGROUND OF THE INVENTION

Information can be provided in various ways, and various messages providing the same information can have subtly (or even substantially) different meaning and be variously effective at disseminating the information. The arrangement of certain message terms, as well as the inclusion or exclusion of various terms, and the combination of a plurality messages in a specific sequential order can impact the way information is disseminated and interpreted.

In an effort to deliver messages or bundles of messages in an effective and optimal way, market research has been developed to test message effectiveness. Known testing practices include choice-based message selection models. Such known models can operate to provide sets of message choices to a respondent, in which each set contains a few (e.g., 3 or 4) options. The options can include individual messages or message bundles. The respective choices can include individual messages or bundles thereof, and some of the individual messages can be provided a number of times to a single respondent, for example, in repeat choice exercises. As used herein, a "choice exercise" refers, generally, to a number of messages and/or message bundles that are provided to a respondent, such as in a survey, for which responses are received in response thereto. Accordingly, the number of theoretical choices can be higher than the actual number choices that are provided to each respondent. In operation, message choices are provided to respondents, and selections are received from the respondents in connection with preferences.

In addition, a TURF analysis, as known in the art, can be used to determine incremental benefits of adding messages to one or more bundles. This is used to determine, for example, messages that may appeal to a relatively high number of people.

Unfortunately, such traditional methodologies have limitations and shortcomings. For example, in case individual messages are tested using a choice-based message selection model, then message bundles may need to be modeled using a simulator. Alternatively, and in case message bundles are tested, then scores for individual messages will have to be modeled, which is similarly not preferred as many messages are modeled to have similar scores.

In addition to the difficulties associated with testing a large number (e.g., over sixty) of messages, conventional choice methodologies are limited in the kinds of messages that are tested, such as original messages only, which limits opportunities to improve messages. Furthermore, conventional testing methodologies do not produce very discriminating scores for messages, nor messages bundles and story flows that are applicable for different marketing channels.

Still further, message testing based on a choice-based message selection model does not take into account individual respondent-level choice drivers. The result can be message choices being tested that have little to no relevance with many respondents in many choice sets, which is inefficient and inaccurate.

It is in connection with these and other concerns that the present disclosure is provided.

BRIEF SUMMARY

In accordance with one or more implementations of the present disclosure, a system and method are disclosed that include receiving, from a user computing device by at least one information processor configured by executing code stored on non-transitory processor readable media, a plurality of messages. Further, for each respective one of the received plurality of messages: a series of steps can be performed. The steps can include identifying, by the at least one information processor, language in the respective message; determining, by the at least one information processor as a function of the identified language, at least one heuristic associated with the respective message; generating, by the at least one information processor as a function of the at least one heuristic associated with the respective message, a first modified version of the respective message, wherein the first modified version includes language that is not in the respective message, and further wherein the first modified version represents the at least one heuristic associated with the respective message; and generating, by the at least one information processor as a function of at least one other heuristic, at least one second modified version of the respective message. Further, the at least one second modified version includes language not in the respective message and not in the first modified version of the respective message, and further wherein the at least one second modified version represents the determined at least one other heuristic. Moreover, the present disclosure includes prompting, by the at least one information processor, a computing device operated by a respondent to respond to a first survey of a plurality messages, wherein the first survey includes at least one of respective messages, at least one first modified version of the respective messages, at least one second modified version of the respective messages, or any combination thereof, and further wherein each determined heuristic associated with the received plurality of messages is represented in the first survey. The at least one information processor can receive, from the computing device operated by the respondent, responses to each of the messages in the first survey, and further can determine as a function of the responses, at least one heuristic associated with the respondent. The at least one information processor can generate a second survey that includes at least one of respective messages, at least one first modified version of the respective messages, at least one second modified version of the respective messages, or any combination thereof, wherein each of the messages in the second survey is associated with the at least one heuristic associated with the respondent. Moreover, the at least one information processor can provide the second survey to the computing device operated by the respondent.

The details of one or more implementations are set forth in the accompanying drawings and the description below. Other features and advantages will be apparent from the description and drawings, and from the claims.

BRIEF DESCRIPTION OF THE DRAWINGS

Aspects of the present disclosure will be more readily appreciated upon review of the detailed description of its various embodiments, described below, when taken in conjunction with the accompanying drawings, of which:

FIGS. 6-8 illustrate example deliverable output in connection with an implementation of the present disclosure;

DESCRIPTION OF EMBODIMENTS

Figure 1:
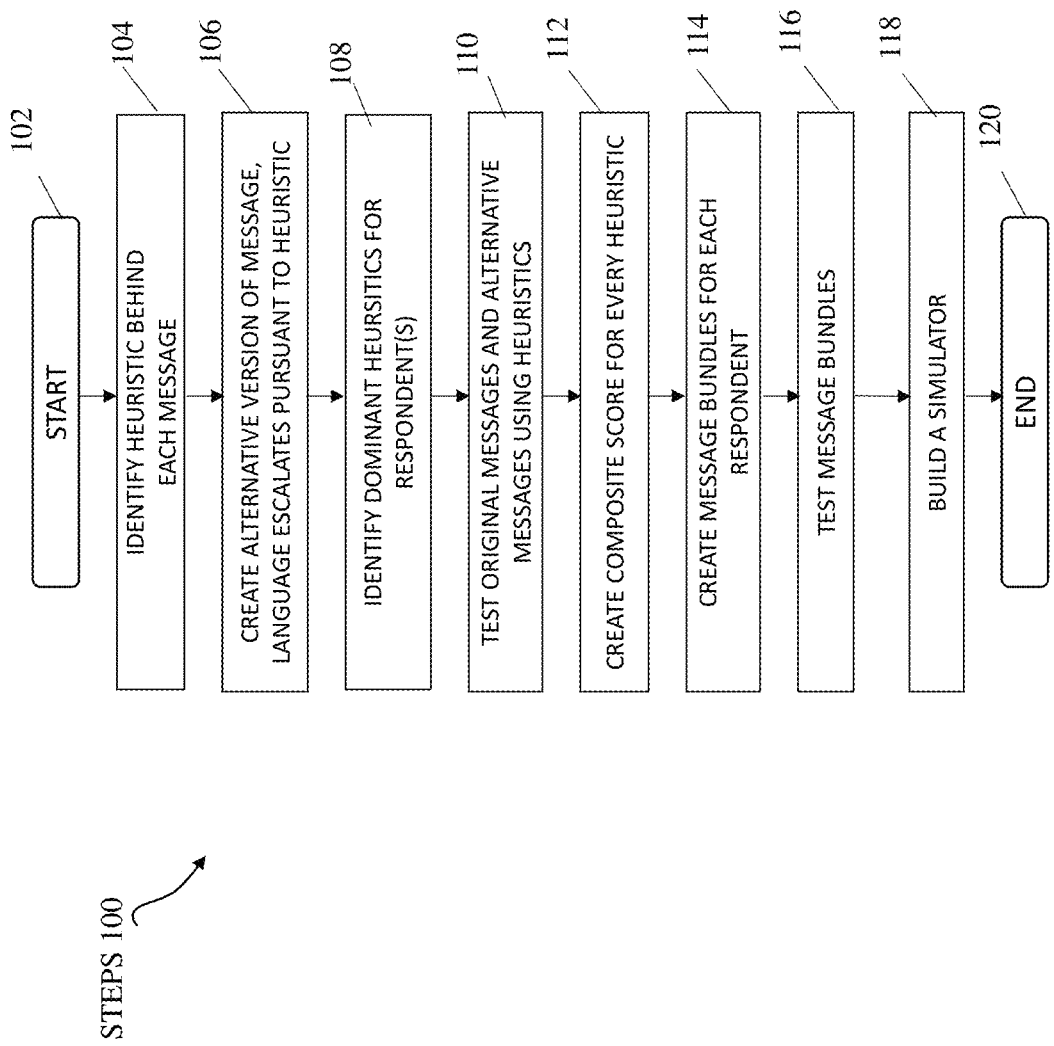
FIG. 1 is a flow diagram showing a routine that illustrates a broad aspect of a method for heuristic-based message testing in accordance with one or more embodiments of the present disclosure.

By way of overview and introduction, the present disclosure implements one or more algorithms for testing, modifying, and generating messages, bundles of messages, and various forms of communications as a function of research that is conducted and/or established via online interactive surveys. Messages can be provided by a customer of a proprietor of the present disclosure, such as a company that sells a particular product. At least one processor that is configured by executing code can operate to modify messages, for example, to suit a particular purpose. Alternatively, messages can be generated and based upon information received from respondents or other sources. Unlike known message development and selection mechanisms, the present disclosure implements processes as an application of decision heuristics science that optimizes message generation and selection testing as a function of quantifiable research. Moreover, the present disclosure provides a heuristics-based learning algorithm for omni-channel message generation and optimization. As used herein, the term "omni-channel" refers, generally, to one or more channels of communications being used to reach customers. For example, omni-channel can include in person face-to-face communication, telephone communication, e-mail correspondence, direct mail, banner advertising, television advertising, or the like.

The present disclosure provides for heuristics-based message testing, generation, provisioning and delivery, which, unlike known message testing models, is effective to modify and optimize presentation of individual messages and message bundles. Such optimization can occur as a function of determining the way(s) that message selection decisions are made, as opposed to being based exclusively on specific messages that are selected. Accordingly, existing messaging testing applications are improved using decision heuristics science. Particular applications of decision heuristics in accordance with the present disclosure are described, generally, below.

In accordance with the teachings herein, decision heuristics can be considered to be mental shortcuts that drive human decisions. For example, in connection with a respective medical therapeutic area or disease state, a set of dominant decision heuristics may exist that drive many treatment decisions. In such case, physicians and patients may be making treatment decisions in a disease state using a specific set of heuristics without realizing it and, accordingly, do not account for heuristics to explain specific behavior.

It is to be recognized that heuristics can be flawed as a basis for decision-making, such as by being cognitive biases, judgment fallacies, or psychological effects, which can lead to poor or even irrational decisions particularly when relied upon very quickly. For example, dread risk bias, which is based on a gravity of harm versus likelihood of risk, can lead to poor decision-making. Another example of bias is ratio-preference bias, in which risk that is presented in the form of ratios is better understood than other forms, such as percentages or decimal values. For example, a message citing to "3 out of 4 people" is preferred over a message citing to "75% of people." Yet another example of bias is loss aversion, which regards a preference to keep something that is already in hand, notwithstanding an opportunity to obtain something better.

A premise set forth in the present disclosure is that heuristics can be used to understand hidden reasons for decisions a respondent makes, including decisions made during a message selection process. One or more computing devices are configured in accordance with the present disclosure to generate and/or use heuristic-based information to influence respondents during message selection, for example, as a function of carefully structured language that addresses individuals' biases.

Turning now to FIG. 1, a flow diagram is described showing a routine 100 that illustrates a broad aspect of a method for heuristic-based message testing in accordance with one or more embodiments of the present disclosure. Among other objectives, the routine 100 quantifies an appeal to respondents of each message that is presented. Further, optimal message bundles are identified separately for each channel. In addition to messages and bundles, the flow 100 regards identifying and providing an optimal flow of messages within a respective bundle, thereby providing an improved system and method for a story flow. Other determinations can be provided, such as specific messages that should be used as substitutions for others, and determining a relative impact of respective message bundles, including in connection with a given product or brand and one or more competitor's products or brands. Such impact(s) can be used to affect operations, including to replace or modify one or more messages in a bundle with an alternative, in accordance with a determination and/or simulation that is based on one or more respective heuristics. Overall, the present disclosure is usable to identify one or more drivers of respondents' appeal to specific messages and message bundles, which is, thereafter, usable for further improvement and effectiveness of future message testing operations.

It is to be appreciated that several of the logical operations described herein are implemented as a sequence of computer-implemented acts or program modules running on one or more computing devices that are operatively connected (e.g., mobile computing device, server computing device) and/or as interconnected machine logic circuits or circuit modules within the system. Accordingly, the logical operations described herein are referred to variously as operations, steps, structural devices, acts and modules can be implemented in software, in firmware, in special purpose digital logic, and any combination thereof. As used herein, a module refers, generally, to a separate unit of software or hardware that can operate in or as various components of a system or method. Modules can operate independently or in combination, including to provide operations shown and described herein.

Continuing with reference to FIG. 1, the process begins at step 102. At step 104, a respective heuristic is identified behind each message, and is tagged in advance ahead of research. Thereafter, at step 106, an alternative version of each message is created, in which one or more computing devices automatically change language set forth in the alternative messages, pursuant to a respective heuristic. For example, an alternative message can be written to the same heuristic as an original message, or could be written to a different dominant heuristic, such as for a disease state that has no or very few messages contained in an original set of messages received from a respective computing device. Thereafter, at step 108, a determination is made that identifies dominant heuristics of a respondent. In one or more implementations of the present disclosure, the determination in step 108 is made early on, such as within the first five minutes of a message selection testing process, to identify how respondents make decisions in advance of exposing respondents to specific messages. At step 110, heuristics are used to test a base message and alternative messages in a choice exercise. In one or more implementations, not all messages are tested with each respondent, however all heuristics are tested and usually in several items.

Continuing with reference to the flowchart illustrated in FIG. 1, at step 112, a composite score is generated for every heuristic at the respondent level. In one or more implementations, the composite score can be generated using heuristic utility scores from a choice exercise. In one or more implementation, based on the hierarchy of heuristics for each respondent, a "shortlist" of best messages can be predicted for each respondent individually, and used to create customized message bundles for each respondent that contain messages that relate to the way, for example, treatment decisions in that disease state are made using heuristics and biases (not shown). At step 114, message bundles are created for each respondent. More particularly, message bundles are created starting with a message from a respondent's highest ranked heuristic(s) and, thereafter, traversing messages associated with ranked heuristic(s). In one or more implementations, heuristic affinity data, as known in the art, from hundreds of past studies can be also used in the process of generating message bundles. Thereafter, at step 116 message bundles are tested in a respective experiment. For example, respondents compare message bundles associated with a given brand's product to other message bundles associated with competitors' product to choose which they would use. At step 118, data from the two choice exercises are used to identify optimal message bundles to maximize preference share against competitors. As described herein, optimal message bundles can be identified as a function of one or more genetic algorithms that are executed by a computing device. Preference share, as used herein, generally indicates an extent of an effectiveness of a particular message bundle, as opposed to alternate bundles, such as to improve a respondent's preference for a product. The share can be derived from choice exercises, in which respondents are exposed to message bundles in a pairwise comparison and are prompted to identify which is more likely to motivate respondents to take action.

Effectively, the selections that are received from a plurality of respondents are usable to predict scores of choices that were not provided to any respondents. At step 120, the process ends.

In accordance with the example series of steps set forth in FIG. 1, scores can be provided for messages, including base messages and alternative messages, to represent ranking of messages based upon performance. Further, scores can be provided for heuristics, including to identify the source of appeal of respective messages. Scores can further be determined for alternative messages, including to assess ways to improve respective messages and message performance. Moreover, scores can be determined for message bundles, including to assess which message bundles perform well in a particular context.

In accordance with the teachings herein, the use of heuristics during message testing can eliminate a need to prompt a respondent for specific information regarding a particular topic, including by identifying one or more drivers of message appeal. Moreover, heuristic-based language in a respective message can often be a particularly effective driver of appeal for a respective message. Accordingly, if a user prefers a particular message and the heuristic that is affiliated with the respective message is known, then a need to ask potentially many diagnostic questions about why a respondent likes/dislikes a message can be eliminated. For example, a bundle of messages can be developed and optimized that regard medical treatment options, without posing specific questions regarding diagnostics. More particularly, heuristics can be used to identify drivers for each respondent's decision-making, such as preferences and biases. Furthermore, different healthcare providers can be motivated by different heuristics, such as whether to address pain, cost, likelihood of recovery, and quality of life, e.g., as driven by situations and circumstances people face while treating a specific disease state. Once underlying heuristics are determined, test messages can be generated and a relatively small sample of messages can be provided to a respondent as a function of the heuristics. Moreover, message bundles can be built and tested as a function of heuristics, and a sequential ordering of messages can be generated to optimize a message bundle.

Figure 2:
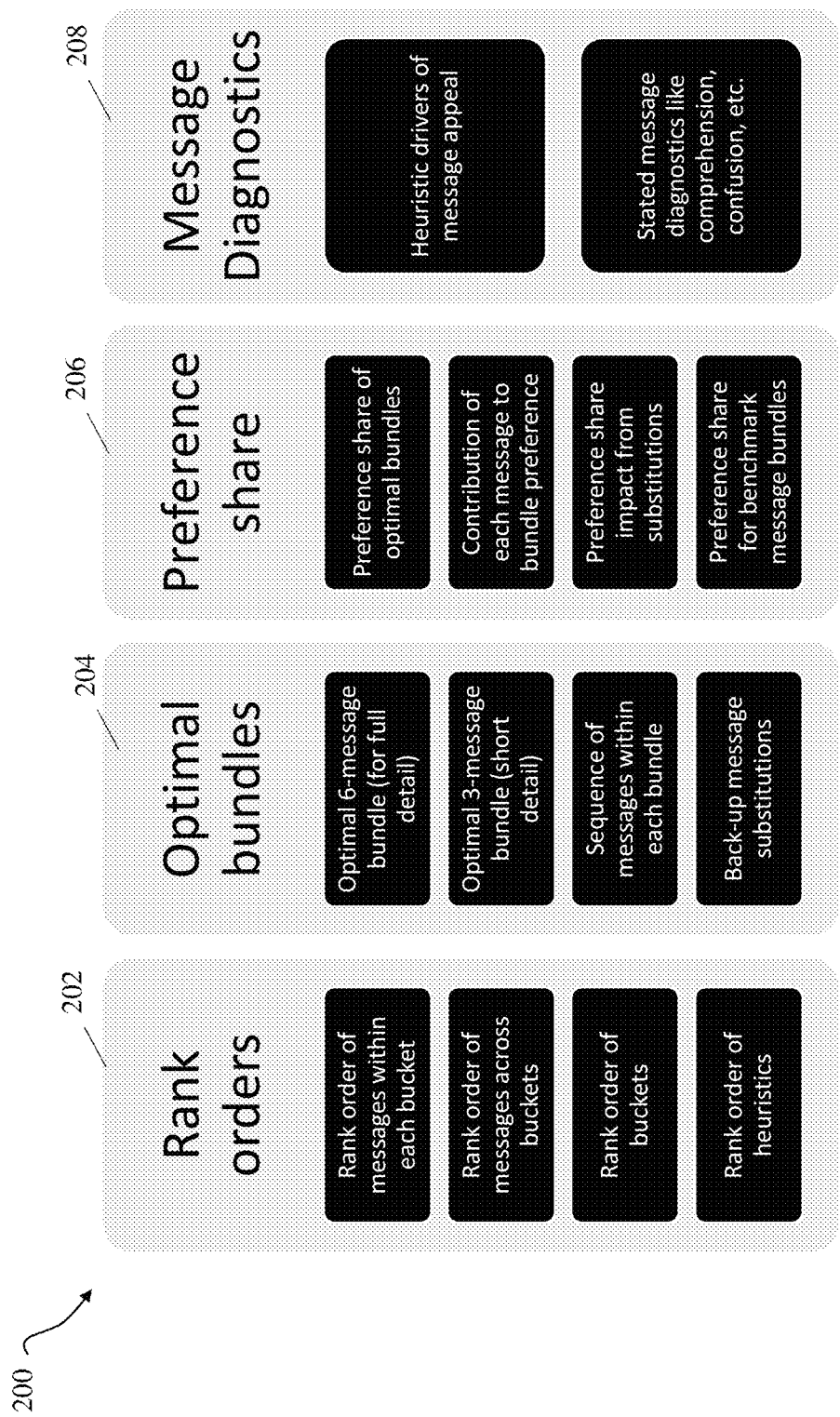
FIG. 2 is a block diagram representing categories of deliverables that can be provided in accordance with one or more implementations of the present disclosure.

FIG. 2 is a block diagram representing example categories of deliverables 200 that can be provided in accordance with one or more implementations of the present disclosure. Specific ordering 202, for example, can be provided for various output and at various levels. For example, messages within each of a plurality of attributes can be provided in a ranked order. For example, different attributes can include different types/categories of messages, such as relating to dosing, efficacy, education, or the like. Furthermore, messages can be provided by a ranked order across a plurality of buckets. Still further, buckets of messages can be provided in a ranked order, as can heuristics that are determined for each of a plurality of respondents. Ranking can be based on various criteria, such as commercial interests (e.g., based on brand and/or product), and can be adjusted or altered over time as criteria are changed or new criteria are introduced.

Continuing with reference to FIG. 2, bundles of messages can be optimized 204 in connection with various platform interests. For example, variously sized bundles (e.g., bundles of six messages or bundles of three messages) can be provided with levels of detail, and messages within each bundle can be provided in specific sequence. Further, one or more messages can be substituted with other messages in order to provide an optimal bundle of messages. Also as illustrated in FIG. 2, a specific preference share 206 can be calculated for a respective bundle using, for example, a genetic algorithm. For example, a preference share can include optimized message bundles, a contribution of each message to a bundle, substitutions and/or for benchmark of message bundles. More generally, determining various message bundles is useful for specific customer segments and media channels. Further, message diagnostics 208 can be provided, including to identify heuristic drivers of a respondent's appeal of a particular message, bundle of messages, and ordering of messages. In particular, diagnostics 208 can be explicitly provided to identify areas of interest, such as whether a respondent found a message and/or message bundle confusing, a degree by which a respondent comprehends a message and/or message bundle, or the like.

In one or more implementations, an interactive data entry platform is provided for which individuals are provided with prompts and are requested to submit responses to the prompts. The data entry platform can be provided via an Internet web-based interface and be accessible using standard web browsing software operating on one or more user computing devices. The present disclosure can run as a single platform with one or more copies of data shared among users from different companies that are authorized to access the data. Alternatively, the application can run as a plurality of platforms.

Figure 3:
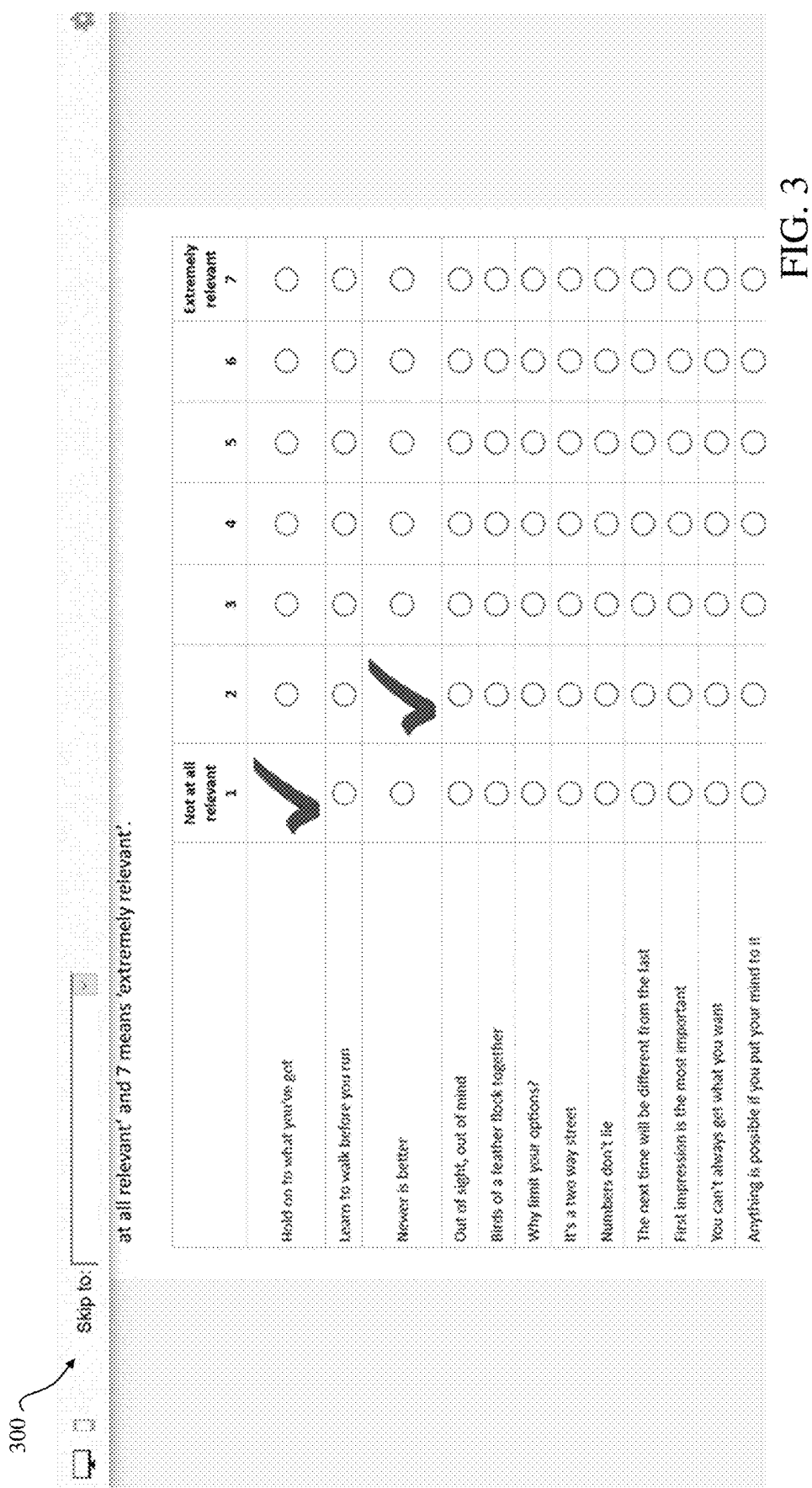
FIGS. 3-5 illustrate example display screens that prompt respondents to select options associated with generating heuristics and message selection.
Figure 4:
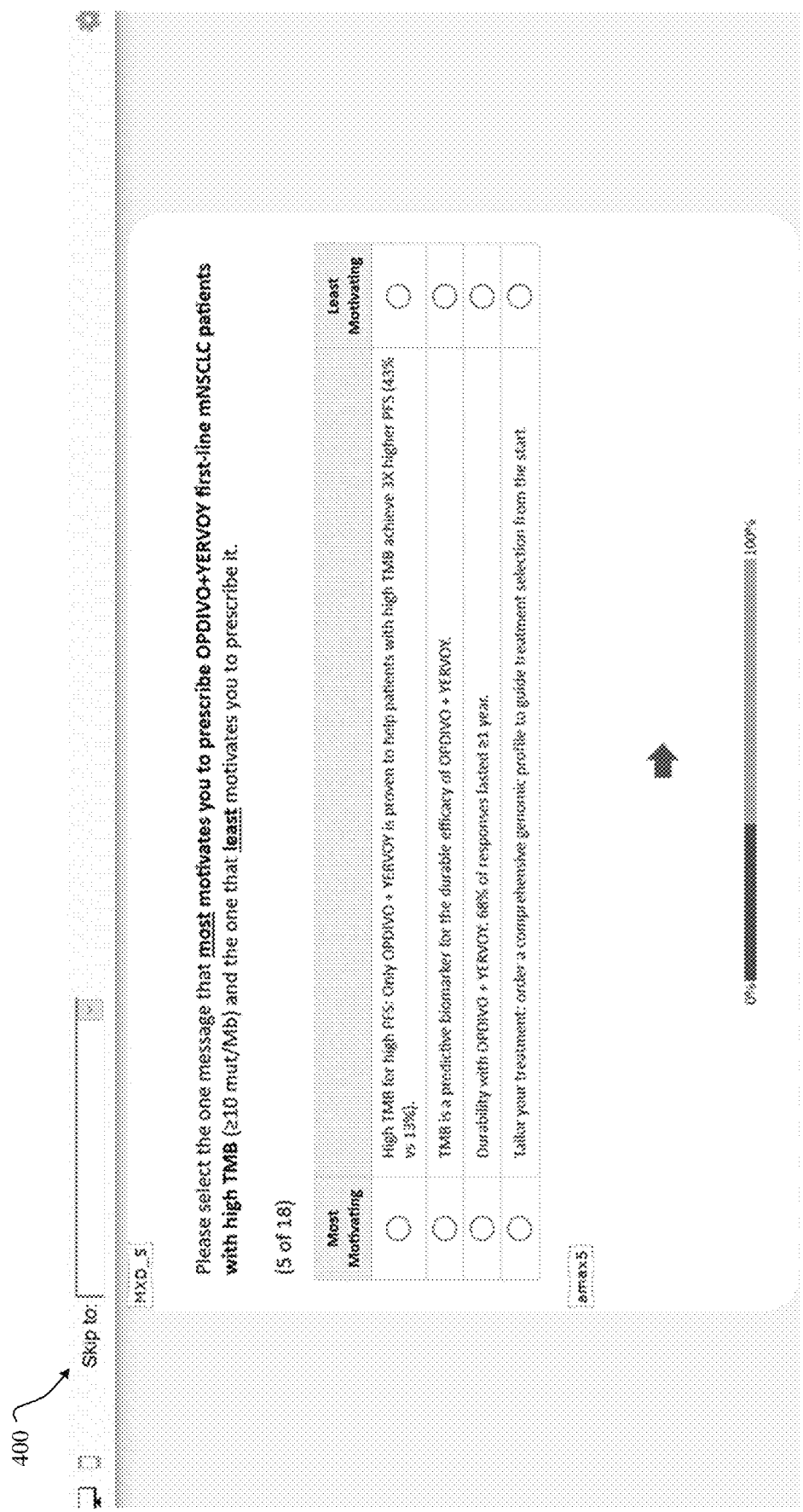
Figure 5:
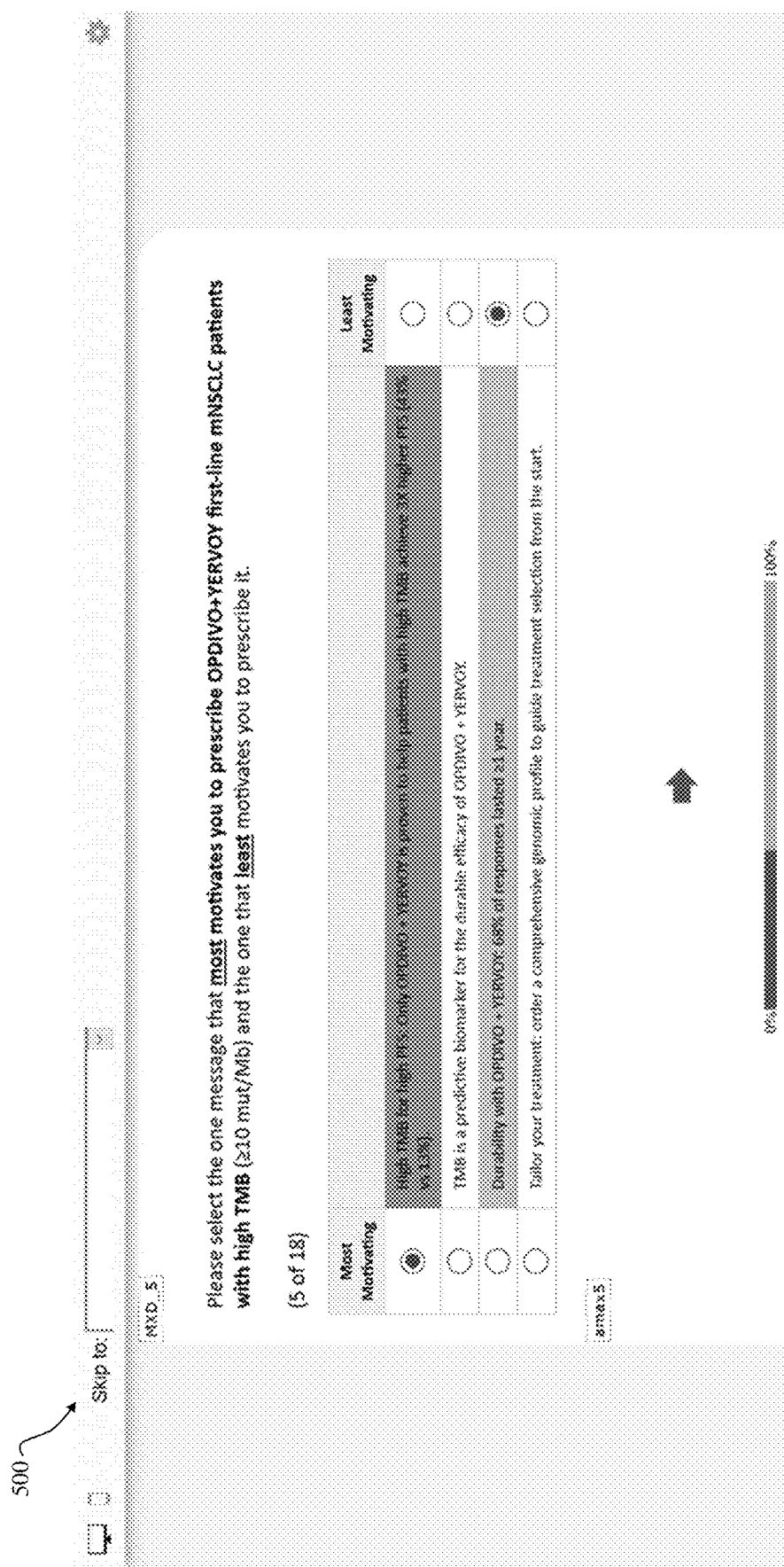

In accordance with one or more implementations of the present disclosure, a series of data-entry display screens are provided to respondents that include specific questions for the respondents to answer. FIGS. 3-5 illustrate example display screens 300, 400, and 500, respectively, that prompt respondents to select options associated with generating heuristics and message selection. As answers to the questions are received, one or more algorithms being executed by a respective computing device, such as a server computer, determine various heuristics that each respondent uses. Individual respondents can be associated with 20 or so heuristics that collectively identify things about each respondent, such as motivations and biases. Using one or more of the heuristics, messages can be generated for and/or associated with the respective respondent, and each of the messages is respectably associated with the one or more heuristics.

The use of heuristics to generate and/or associate messages in bundles provides for increased efficiency. For example, a respondent is being prompted to respond to a number of questions regarding automobiles. The total number of questions may be equal to 50. After heuristics have been determined for the respondent, however, a reduced set of messages may be provided without loss of accuracy. For example, only 24 of the 50 messages are actually shown to the respondent and a computing device executing one or more algorithms predicts response scores for all 50 messages. In one or more implementations, this can be provided by ranking messages pursuant to one or more heuristics associated with the respondent. The topmost 24 messages in the ranked order can provide sufficient accuracy for the system to determine predictions for all 50 questions.

It is preferred that multiple heuristics be determined and used in connection with each respondent, which increases efficiency in the system. For example, a small subset of messages (e.g., five messages) can be associated with a respective heuristic. For others, 20 or more messages may exist. In a medical-based implementation, for example, the number of messages depends on a particular disease state. In operation, each heuristic is preferably repeatedly tested. Each time a heuristic is tested, a different message based on that heuristic can be randomly selected and shown to a respondent. Moreover, all 50 of the messages can be ranked automatically in accordance with the respondent's particular interests. Furthermore, heuristics can be ranked in accordance with one or more algorithms, and such heuristic ranking can occur and be used as a basis for ranking messages. By identifying topmost important messages for a given respondent, based on that respondent's heuristics, bundle(s) of messages can be created. For example, thousands of bundles can be created using the topmost significant messages for each respondent. The present disclosure operates to create and test most relevant bundles for each respondent.

Accordingly, and in one or more implementations of the present disclosure, heuristics are determined for respondents, and a ranking of heuristics is created. Thereafter, messages that are associated with the highest ranked heuristics can be prioritized during the process of creating a shortlist of messages to be used for creating and testing message bundles. By ranking the heuristics and associated messages, a bundle of just a few messages is created. In one or more implementations, respondents are provided the bundle and prompted to adjust the sequence of the messages in accordance with the respondent's preferences. Once the bundle of messages has been ranked in accordance with the respondent's preferences, one or more algorithms are executed by a computing device to determine additional message bundles. For example, values are assessed in connection with messages in the bundle of messages that are ranked by the respondent, and additional bundles of messages are generated using the calculated scores.

In a preferred implementation of the present disclosure, various steps, including identifying heuristics associated with respondents, prioritizing messages associated with each of the heuristics, and generating new message bundles as a function of scores that are calculated therefrom, occur substantially in real time as respondents interact with the data entry platform. This represents a significant improvement in efficiency, as the system continues to learn and predict as users interact. This is further improved as a function of respondents reorganizing messages, which is used by one or more computing devices to produce new message bundles and to rank the messages in the bundles in particular orders.

Accordingly, heuristics-based message testing overcomes limitations of traditional methodologies. For example, by presenting choices to respondents based on how decisions are made, the respondent's exposures are much more relevant. Moreover, by testing both messages and message bundles, scores for both are more discriminated and reliable. In addition, drivers of message appeal are identified without collecting diagnostics, and improvements in messaging are tested for every original message. Moreover, message bundles can be optimized for all communication needs. For example, a message bundle can be optimized with messages from all attributes to guide overall messaging strategy. Message bundles can be optimized for various communication channels, such as personal selling, email, direct mail, banner advertisements, or the like. Further, a core message bundle of 3-5 messages can be optimized for quick delivery to customers (e.g., physicians or patients). In addition, message bundles within each attribute can be optimized to guide development of marketing collateral materials, such as Visual Aid used by salespeople, patient brochures, or the like.

FIGS. 6-9 illustrate example deliverable output in connection with an implementation of the present disclosure. FIG. 6 illustrates an example summary display screen 600 that is associated with research inputs. For example, the display screen 600 illustrates attributes, and further informs the viewer of the numbers of messages tested across various attributes, the number of visuals tested, the shortest message bundle having a number of messages, and a "heuristicized" alternative that was tested in roughly one in every 50 messages. Moreover, FIG. 6 identifies an example original message and a modified version thereof as a function of heuristics.

FIG. 7 illustrates a summary display screen 700 that provides information associated with an optimal story flow preference share. For example, two respective brands are identified with corresponding shares of preference among respondents, and the number of messages that were tested per respective brand is also displayed. The respective preference shares are further represented by the respective prompt provided to respondents via the interactive data entry platform.

Figure 8:
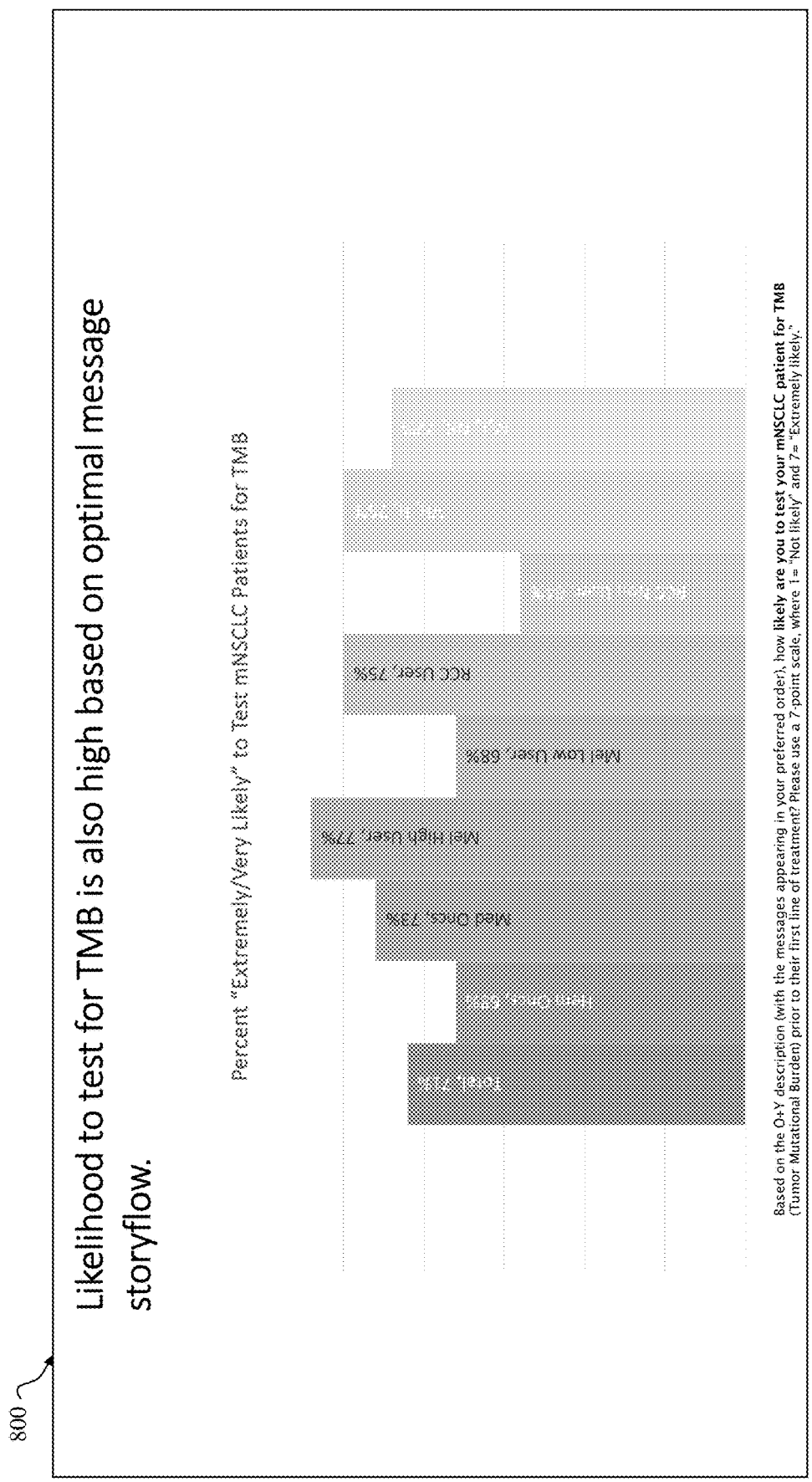

FIG. 8 illustrates a summary display screen 800 that provides information associated with respective likelihoods of respondents to take specific action based on an optimal message story flow. In the example shown in display screen 800, the action regards testing for a specific disease and is qualified as a function of the respective prompt shown in display screen 800 and provided to respondents. In addition to providing the overall likelihood, display screen 800 identifies specific users and corresponding percentages represent each percentage likelihood.

Other examples of deliverables, including graphics, summary data, example prompts and display screens are supported by the teachings herein. Accordingly, as shown and described herein, the present disclosure applies an algorithm to test messages based on how each of a plurality of respondents makes treatment decisions for a patient who is in a disease state. In one or more implementations, messages are tested individually, and thereafter customized bundles of messages can be tested, including during presentation of the customized bundles.

Figure 9:
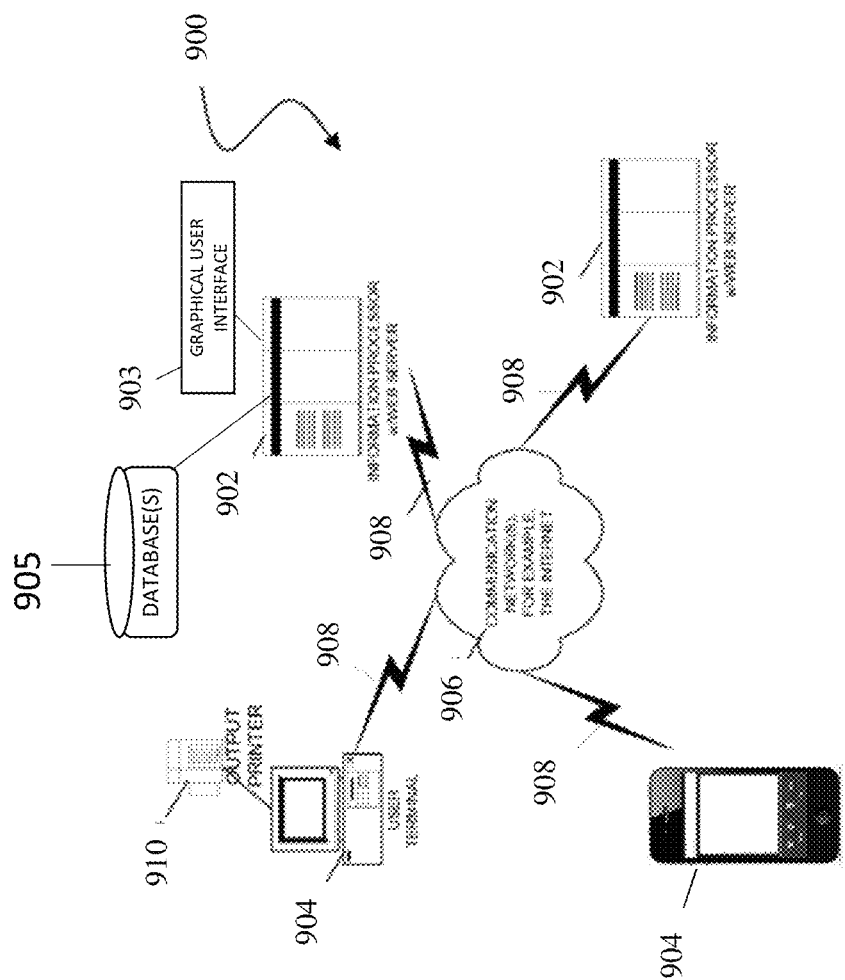
FIG. 9 is a block diagram of an example hardware arrangement that operates for providing the systems and methods disclosed herein, in accordance with one more implementations of the present disclosure.

FIG. 9 is a block diagram of an example hardware arrangement that operates for providing the systems and methods disclosed herein, and designated generally as system 900. System 900 is preferably comprised of one or more information processors 902 coupled to one or more user computing devices 904 across communication network 906. User computing devices may include, for example, mobile computing devices such as tablet computing devices, smartphones, personal digital assistants or the like. Further, printed output is provided, for example, via output printers 910.

Information processor 902 preferably includes all necessary databases 905 for the present invention, including image files, metadata and other information such as shown and described herein. However, it is contemplated that information processor 902 can access any required databases via communication network 906 or any other communication network to which information processor 902 has access. Information processor 902 can communicate with devices comprising databases 905 using any known communication method, including a direct serial, parallel, USB interface, or via a local or wide area network.

User computing devices 904 communicate with information processors 902 using data connections 908, which are respectively coupled to communication network 906. Communication network 906 can be any communication network, but is typically the Internet or some other global computer network. Data connections 908 can be any known arrangement for accessing communication network 906, such as dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 904 preferably have the ability to send and receive data across communication network 906, and are equipped with web browsers to display the received data on display devices incorporated therewith. By way of example, user computing device 904 may be personal computers such as Intel Pentium-class computers or Apple Macintosh computers, but are not limited to such computers. Other user computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 906. Of course, one skilled in the art will recognize that wireless devices can communicate with information processors 902 using wireless data communication connections (e.g., Wi-Fi).

According to an embodiment of the present disclosure, user computing device 904 provides user access to information processor 902 for the purpose of receiving and providing information. The specific functionality provided by system 900, and in particular information processors 902, is described in detail below.

System 900 preferably includes software that provides functionality described in greater detail herein, and preferably resides on one or more information processors 902 and/or user computing devices 904. One of the functions performed by information processor 902 is that of operating as a web server and/or a web site host. Information processors 902 typically communicate with communication network 906 across a permanent i.e., unswitched data connection 908. Permanent connectivity ensures that access to information processors 902 is always available.

Figure 10:
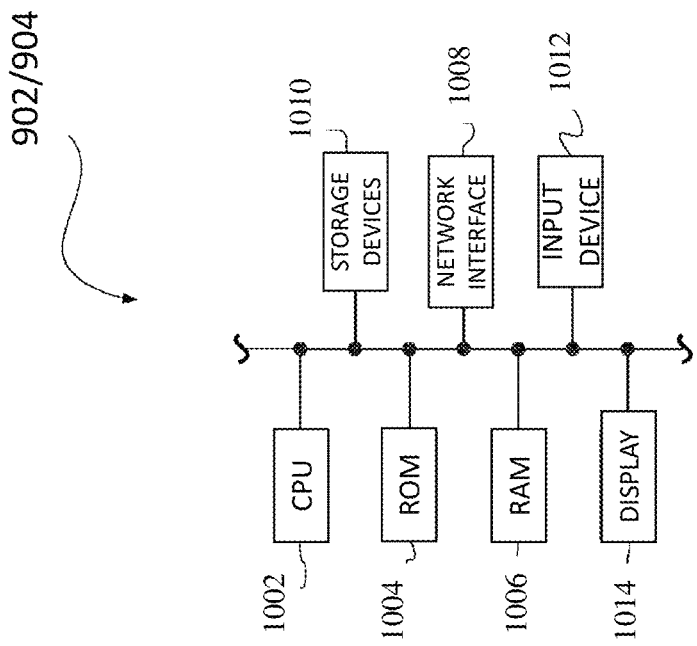
FIG. 10 is a block diagram illustrating example functional elements of an information processor and/or user computing device.

As shown in FIG. 10 the functional elements of an information processor 902 and/or user computing device 904 are shown, and preferably include one or more central processing units (CPU) 1002 used to execute software code in order to control the operation of information processor 902, read only memory (ROM) 1004, random access memory (RAM) 1006, one or more network interfaces 1008 to transmit and receive data to and from other computing devices across a communication network, storage devices 1010 such as a hard disk drive, floppy disk drive, tape drive, CD-ROM or DVD drive for storing program code, databases and application code, one or more input devices 1012 such as a keyboard, mouse, track ball and the like, and a display 1014.

The various components of information processor 902 need not be physically contained within the same chassis or even located in a single location. For example, as explained above with respect to databases 905 which can reside on storage device 1010, storage device 1010 may be located at a site which is remote from the remaining elements of information processors 902, and may even be connected to CPU 1002 across communication network 906 via network interface 1008.

The functional elements shown in FIG. 10 (designated by reference numbers 1002-1014) are preferably the same categories of functional elements preferably present in user computing device 904. However, not all elements need be present, for example, storage devices in the case of PDAs, and the capacities of the various elements are arranged to accommodate expected user demand. For example, CPU 1002 in user computing device 904 may be of a smaller capacity than CPU 1002 as present in information processor 902. Similarly, it is likely that information processor 902 will include storage devices 1010 of a much higher capacity than storage devices 1010 present in user computing device 904. Of course, one of ordinary skill in the art will understand that the capacities of the functional elements can be adjusted as needed.

The nature of the present disclosure is such that one skilled in the art of writing computer executed code (software) can implement the described functions using one or more or a combination of a popular computer programming language including but not limited to C++, VISUAL BASIC, JAVA, ACTIVEX, HTML, XML, ASP, SOAP, IOS, ANDROID, TORR and various web application development environments.

As used herein, references to displaying data on user computing device 904 refer to the process of communicating data to the user computing device across communication network 906 and processing the data such that the data can be viewed on the user computing device 904 display 1014 using a web browser or the like. The display screens on user computing device 904 present areas within system 900 such that a user can proceed from area to area within the system 900 by selecting a desired link. Therefore, each user's experience with system 900 will be based on the order with which (s)he progresses through the display screens. In other words, because the system is not completely hierarchical in its arrangement of display screens, users can proceed from area to area without the need to "backtrack" through a series of display screens. For that reason and unless stated otherwise, the following discussion is not intended to represent any sequential operation steps, but rather the discussion of the components of system 900.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

To provide for interaction with a user, the systems and techniques described here can be implemented on a computer having a display device (e.g., an LCD (liquid crystal display) or plasma display monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

It is to be apparent to one of ordinary skill that limitations exist on the number of messages and, correspondingly, message bundles that can be attributable to various factors. For example, recipients of messages have finite amounts of time and attention to review and respond to messages. In many cases, it is simply too exhaustive to inundate recipients with hundreds or thousands of messages to provide insights on hundreds of thousands or millions of messages stored in a database. Accordingly, the present disclosure implements machine learning and artificial intelligence, and executes one or more algorithms to predict effectiveness, including of respective messages and bundles of messages. Implementations of the present disclosure operate by using a combination of behavioral science and artificial intelligence to analyze data (e.g., messages) and generate optimized compilations of data (e.g., bundles messages). The ability to make accurate predictions regarding the effectiveness messages or message bundles ensures that a large inventory in one or more databases 905, such as containing millions of messages, is practicable and usable in a way that was heretofore not possible. The present disclosure implements one or more algorithms to test and ensure effectiveness in a sample of messages and, thereafter, predict effectiveness across a large body of data of untested messages.

It is further to be understood that the number of messages stored in a large inventory may be dynamic (e.g., by increasing and/or decreasing over time), while the number of message bundles from which data regarding message effectiveness can be garnered remains relatively constant. In accordance with the teachings herein, at least one processor s can use machine learning and artificial intelligence to predict the effectiveness of respective bundles of messages, notwithstanding no available data for messages in a respective bundle, or the bundle itself. As described in greater detail herein, this can be provided as a function of a combined methodology including message validation, calibration, and cross-breeding.

Message validation, as generally used herein, regards testing of individual messages, such as by providing messages to individual respondents and receiving feedback regarding the messages from the respondents. In addition (or in the alternative), existing data stores containing verified records, such as records generated from pre-existing studies, can be used as sources for machine learning and data validation. One known verification technique is brute-force data validation, which is usable in one or more implementations of the present disclosure to generate an accurate baseline using optimized records for calibration, i.e., for machine learning and for training using additional data sets. Such message validation can be used to identify one or more messages and/or bundles of messages that ensure an optimal level of accuracy. Such messages can have various metadata applied thereto, such as to identify appropriate respective heuristics and to identify content associated with the messages.

The present disclosure provides for a form of data calibration for training one or more data models that operate to predict highly accurate and effective messages in an inventory in a given context. Using machine learning, a data model is trained based on records (e.g., messages) that have been previously verified. For example, metadata associated with a previously verified record identifies a message as being within a category "A" that is associated with a respective heuristic. During training, the model predicts the message should be assigned to a different category, such as "V," which may be similar, but not sufficiently close to "A" to be within a high confidence. During one or more retraining processes, results from machine learning alter the model's prediction from "V" to "B," which may be closer than the first prediction, but still not above a minimum threshold. Typically, anything over 70% predictive accuracy is considered good performance in machine learning. The various machine leaning algorithms and features shown and described herein have been trained to provide significantly higher accuracy, such as to be more than 90% accurate. Accordingly and continuing with this example, additional machine learning is applied, which results in improved training and the model predicting to classify the message as "A" or thereabouts and within an acceptable tolerance, evidencing the model being sufficiently trained. Repeating this process on a suitable sample set of verified messages, such as 5,000-10,000 verified messages, results in the model being sufficiently trained to be able to predict accurately hundreds of thousands or even millions of otherwise unverified messages in a way that, heretofore, was not possible.

Accordingly, in one or more implementations the present disclosure provides for development and deployment of a generic rule-based combinatorial optimization framework that provides optimal message solutions. The solutions maximize a preference share of client product, such as against competitors, based on utilities of sets of messages (message bundles). One or more various inputs can be suitable dataset(s), such as but not limited to: message utility data, message inventory; omnichannel message map(s); calibration parameters; and problem specific constraints.

More particularly, message utility data can include respondent level utility scores for each of a plurality of messages. Message utility data can include utility scores that represent measures of a degree by which a respondent who is exposed to a message likes or dislikes the message and/or will respond in a way desired by the provider. Such value can be, for example, a positive or negative value. Message inventory can include values stored in one or more databases, and contain messages and other related information (e.g., metadata) that represents a message's attribute, bias, type/source, client identification, or other suitable category. Further, an omnichannel message map can be developed that represents overall and attribute level message bundle constraints for various marketing channels, such as email, web site, mobile app, text, print, or other channel. Calibration parameters can represent external effects for a client's product and a competitor's, and can include values such an exponent, none, weight, or other suitable value. Additionally, problem specific constraints can represent constraints on minimum and maximum number of messages to be included in a bundle, set and travelling sets, subset constraints based on subgroups, message type, bias, or the like.

The present disclosure also can be used to generate and/or use metrics associated with these and other suitable datasets and can represent, for example, a respective preference share of a client's product based on computation of an overall share of optimal message bundles. The computation can take into consideration an individual respondent level utility of messages, as well as relevant external effect parameters on a client's product and competitors.

As noted herein, one or more information processors 902 can execute one or more algorithms in connection with machine learning and artificial intelligence to generate optimal messages and message bundles. Example algorithms include one or more genetic algorithms and differential evolution optimization algorithm(s). As known in the art and as used herein, a genetic algorithm refers, generally, to a search heuristic that is inspired by a theory of natural evolution. In operation, a genetic algorithm reflects processes of natural selection in which the fittest individuals are selected for reproduction in order to produce offspring of the next generation. In accordance with the present disclosure, an approach utilizing one or more genetic algorithms is appropriate for finding solutions that require efficient searching of a solution space (or a subset thereof) to identify optimal or nearly optimal combinations for solving high-dimensional optimization problems, especially when the search space is large and complex.

In addition to (or in place of) one or more genetic algorithm(s), a differential evolution optimization algorithm can be suitable for machine learning and training for artificial intelligence operations to identify preferred messages and message bundles. As known in the art and referred to herein, a differential evolution optimization algorithm represents, generally, an evolutionary technique in which each successive generation of results transforms a set of parameter vectors, the "population," into yet another set of parameter vectors. The members of the population are more likely to minimize the objective function. In order to generate a new parameter vector, differential evolution optimization revises an old parameter vector with the scaled difference of two randomly selected parameter vectors. It is to be recognized that the performance of differential evolution optimization is similar to a genetic algorithm, although a convergence to a solution based solely on differential evolution optimization was observed to be slower than a genetic algorithm. Further, a genetic algorithm has been found to provide binary, real-valued and permutation representations to optimize a fitness function. For example, a fitness function can be a user-defined function based on an objective of maximization/minimization of a predefined utility/metric. This makes a genetic algorithm a preferred application to address discrete combinatorial problems, both constrained and unconstrained.

In one or more implementations of the present disclosure, a framework uses an R language implementation of a genetic algorithm and is built taking into consideration at least a pre-defined exhaustive set of constraints, such as rules, for optimizing a client product's preference share. The framework can be implemented to include a plurality of components including, but not limited to: an input (e.g., spreadsheet) file; a program script to read the input; a program script to process the input and generate one or more initial message bundles; a program script to apply constraints and rules; a program script to execute a genetic algorithm (or differential evolution optimization, as described above); and a programming script to generate an output file including the top solutions. It is envisioned herein that other machine learning techniques are supported by the present disclosure, such as by implementing neural networks or support vector machines, which can achieve similar tasks and achieve a degree of accuracy that is comparable with results achieved via brute force methods, as described herein.

In one or more implementations an input file used for machine learning is a spreadsheet file, such as an MS-EXCEL file. The spreadsheet can be provided in a predetermined format that ensures a high likelihood of optimization. The input file can include data that are useable for the optimization model, such as a utility matrix, message inventory, constraints, external effects parameters, or the like. In operation, the input can be read as a function of a program script, such as an R program script, which can include the utility matrix, message inventory, constraints, parameters, or the like that are in the input file.

In one or more implementations of the present disclosure, the program script processes the input generates an initial valid solution (such as a message bundle) that satisfies the respective input constraints that are set forth in the input file. When executing the program script, one or more information processors 902 can create a solution space that is, thereafter, processed by the genetic or other algorithm. By applying constraints and rules, the program script can result in a principal objective function coded for every constraint and rule specified in the input file, and to calculate a final fitness value, such as a respective preference share, based on predefined mathematical formula and calibration parameters. Following processing as a function of, for example, the genetic algorithm, an output file, such as another MS-EXCEL file, can be created that contains the top N optimal solutions per a user's request, along with a summary tab containing the entire solution space covered by the model along with each fitness value and bundle size.

The present disclosure further supports a form of cross-breeding, in which an accurate selection of preferred messages, message bundles and one or more respective delivery mechanisms can be made as a function of artificial intelligence and machine learning. This effectively eliminates a need to resort to an approach relying on brute force calculation and use of unreliable or poor delivery channels. For example, two message bundles are generated and tested, and one message bundle tests better than the other. Using the two bundles, a new bundle of messages that is improved over both of the two message bundles, a mix of the highest scoring messages from both bundles is selected to form a new bundle. Continuing with this example, two other message bundles are generated and tested, of which one tests better than the other, and yet another new message bundle is generated from a mix from both bundles. Thereafter, the two newly generated message bundles can be tested, and a third new message bundle is generated using the highest scoring messages from the two bundles. Accordingly, a form of message bundle cross-breeding is provided that generates message bundles having improved quality and reliability.

Figure 11:
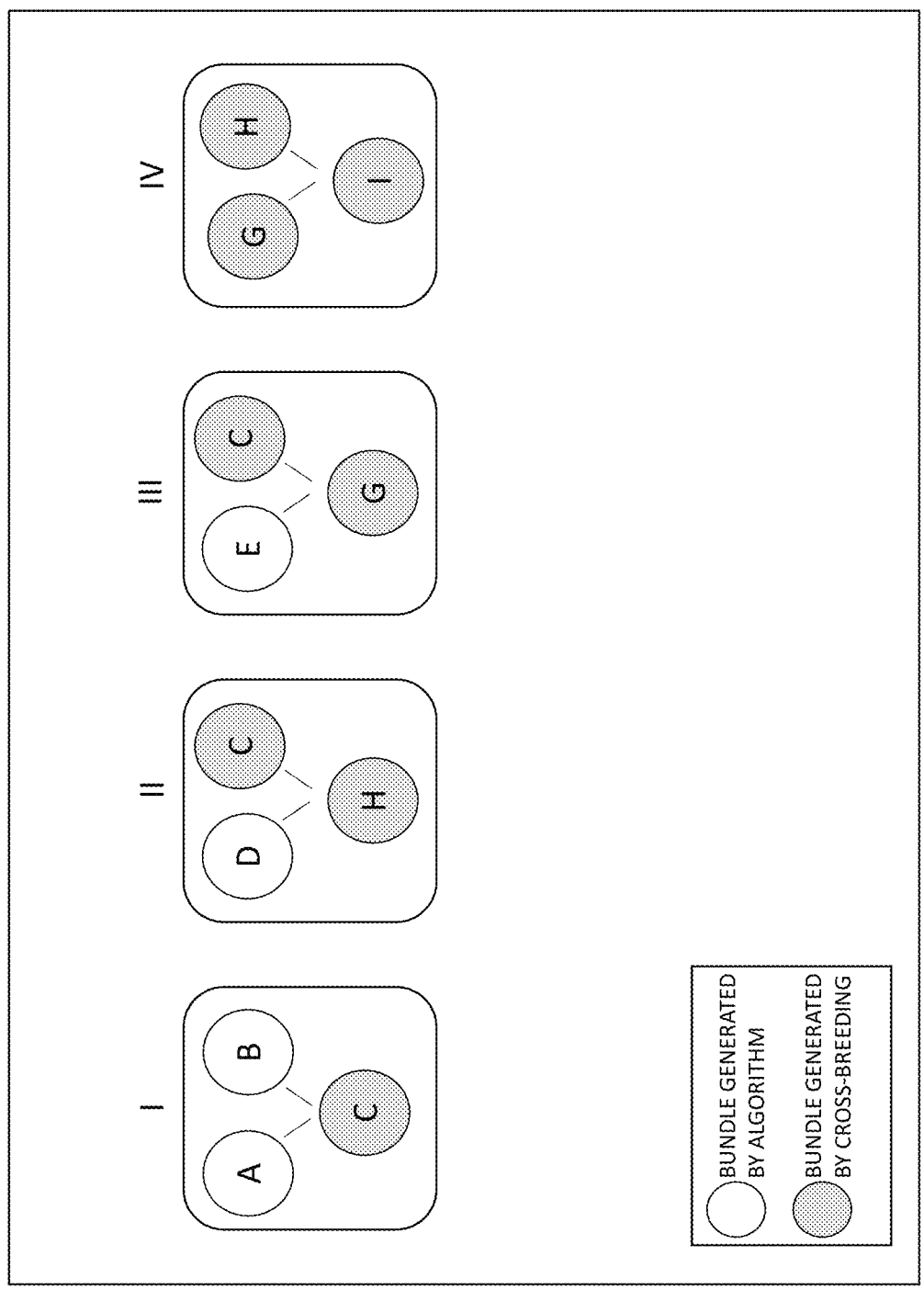
FIG. 11 is a block diagram illustrating bundles of messages that are generated by a genetic or other algorithm, in accordance with one or more implementations of the present disclosure.

It is recognized, however, that repeatedly cross-breeding message bundles can have an unintended negative effect that results in diluted and less accurate message bundles. Accordingly, one or more implementations of the present disclosure employs a hybrid approach to cross-breeding, in which a message bundle is created via cross-breeding two message bundles, and that bundle is cross-bred with a message bundle that itself was not a product of cross-breeding. For example, FIG. 11 illustrates an example plurality of processes I-IV, in which messages bundles are created via cross-breeding techniques. In the example shown in FIG. 11, bundles of messages that are represented in clear circles (i.e., A, B, D, & E) are message bundles that are generated by a genetic or other algorithm, or a combination of a genetic algorithm with another algorithm, such as differential evolution optimization. Bundles of message that are represented in shaded circles (C, G, H, & I) are message bundles that are generated as a function of cross-breeding techniques. For example, in Process I, message bundles A and B are generated using a genetic algorithm, and message bundle C is generated via cross-breeding messages from bundles A and B. In Processes II and III, the message bundle C is respectively cross-bred with message bundles D and E, creating message bundles G and H. Bundles G and H are generated via a hybrid cross-breeding process, including cross-breeding a message bundle generated via a genetic algorithm with a message bundle generated by cross-breeding. Thereafter, two message bundles (G and H) generated via cross-breeding techniques are used to generate a new message bundle I. In the example shown in FIG. 11, message bundle I is predicted to be most accurate and optimal.

The present disclosure is now further described with reference to an example implementation and with reference to FIGS. 12-18.

Figure 12:
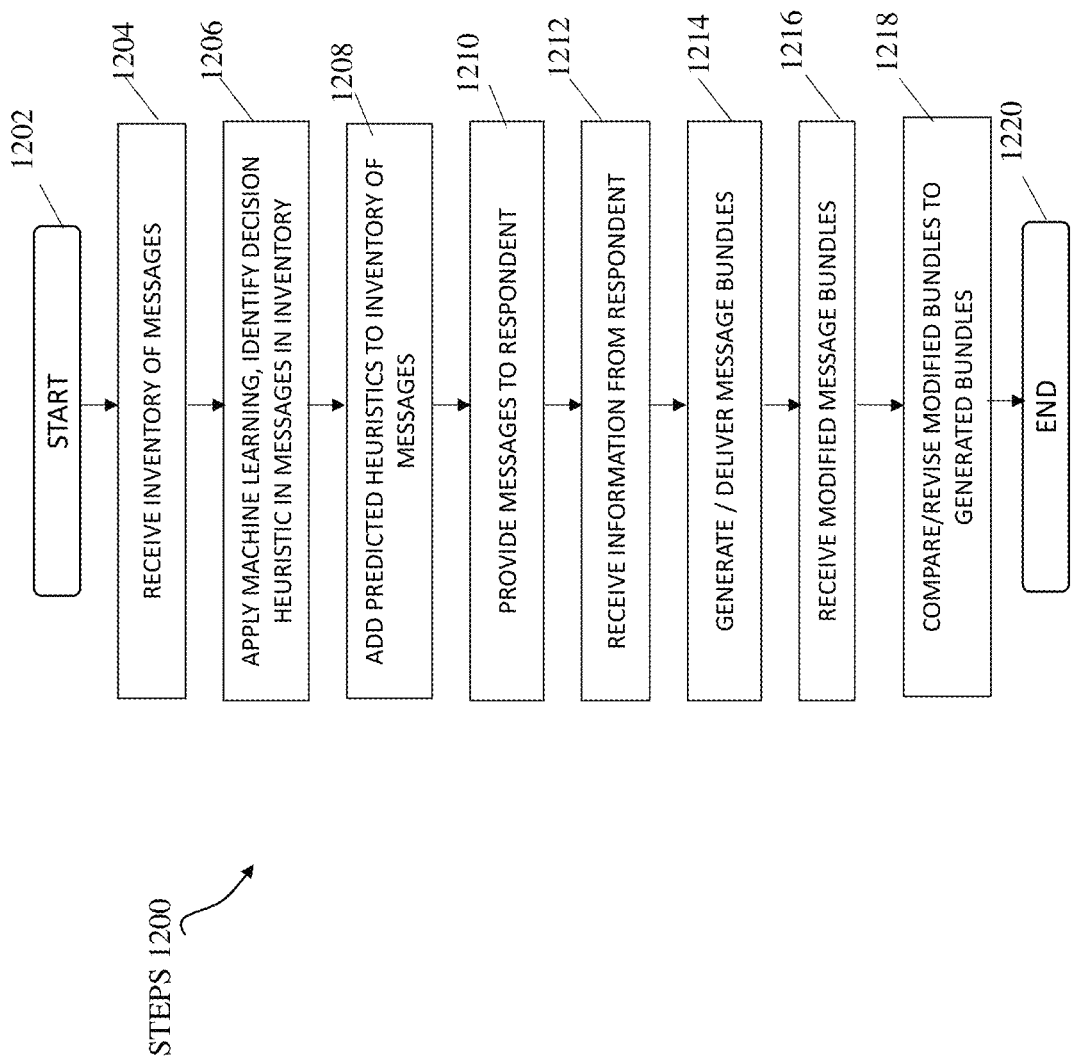
FIG. 12 is a flow diagram showing steps in an example routine for generating, modifying and testing discrete bundles of messages as a function of machine learning and artificial intelligence.

FIG. 12 is a flow diagram in connection with an example routine 1200 that illustrates a broad aspect of a method for generating, modifying and testing discrete bundles of messages as a function of machine learning and artificial intelligence, as shown and described herein in accordance with one or more embodiments of the present disclosure. At step 1202, the process starts and, at step 1204, an inventory of messages is received, such as from a customer of a proprietor of the present disclosure. The inventory of messages is received in view of a desire by the client to know which messages in the inventory are of the highest quality (e.g., will elicit the most useful responses), and what is the best bundle of messages that can be created from this inventory if each bundle was to contain just a few messages, such as between 6 to 10 messages. At step 1206, machine learning is applied to identify heuristics in each message that was received in the inventory. For example, decision heuristics that are embedded in a message are identified by one or more information processors 902 executing algorithms to analyze the language in the message and compare the language to heuristics-based message language stored in a database 905 or other data store that is accessible by a computing device. Thus, processing in step 1206 can occur based at least on part by comparing stored messages that have previously been analyzed and tagged with information representing a heuristic with messages received in the inventory.

Continuing with reference to FIG. 12, at step 1208 respective heuristics that are associated with the messages are identified and added to the inventory of messages that were previously received in step 1204. Thereafter, at step 1210, a survey is created that includes messages and subsequently delivered to respondents. For example, the survey is provided in the form of choice exercises, such as shown and described herein. Thereafter, responses are received (step 1212), and one or more algorithms executing on at least one processor result in machine learning from what heuristics respondents prefer most. Using that information, message bundles are created and delivered in step 1214.

After message bundles have been delivered to a client, changes to the messages and/or bundles may need to be made in view legal, operational, regulatory, or other constraints. At step 1216, modified messages and/or message bundles are received. Changes that were made to delivered optimal message bundles (step 1214), particularly changes that include multiple and/or cumulative substitutions, may raise a question whether a negative and potentially cumulative impact has been made that reduces or eliminates effectiveness of the original message bundle. At step 1218, one or more algorithms are executed by one or more information processors 902 that compare the modified messages and/or message bundles received in step 1216 to the messages and/or message bundles that were previously transmitted in step 1214. For example, the algorithm(s) operate to predict whether the modifications have a meaningful impact (positive or negative) on the appeal or effectiveness to a respondent. A risk associated with substitutions can be calculated and provided in connection with each respective message attribute. For example, a message attribute in an optimal message bundle can have a risk to the preference share of 0.0%. In addition, next best alternative messages for substitution can be shown to have a respective percentage risks to the preference share that are each higher than 0.0. The alternative messages can be displayed in various ways, for example in ascending order by percentage risk value.

In one or more implementations, an algorithm is executed by one or more information processors 902 to compare the message bundles and determine whether a modified bundle received in step 1216 is better (e.g., preferable or more effective) than the optimal message bundle transmitted in step 1214, whether it is essentially the same, or whether it is less good. In other words, an analysis is performed that effectively determines a form of win, lose, or tie between the originally generated optimal message bundle and a modified version thereof. Artificial intelligence and existing data stored in one or more databases 905 (e.g., a data source used for initial training) can be used to form a prediction whether the effectiveness of the modified message bundle received in step 1216 is better than, worse than, or is effectively the same as the optimal message bundle that was generated and transmitted in step 1214. In this way, a convenient and efficient technique is provided that determines relative effectiveness of messages and message bundles without having to rerun complex and time-consuming processes associated with message and message bundle generation and analysis.

Figure 13:
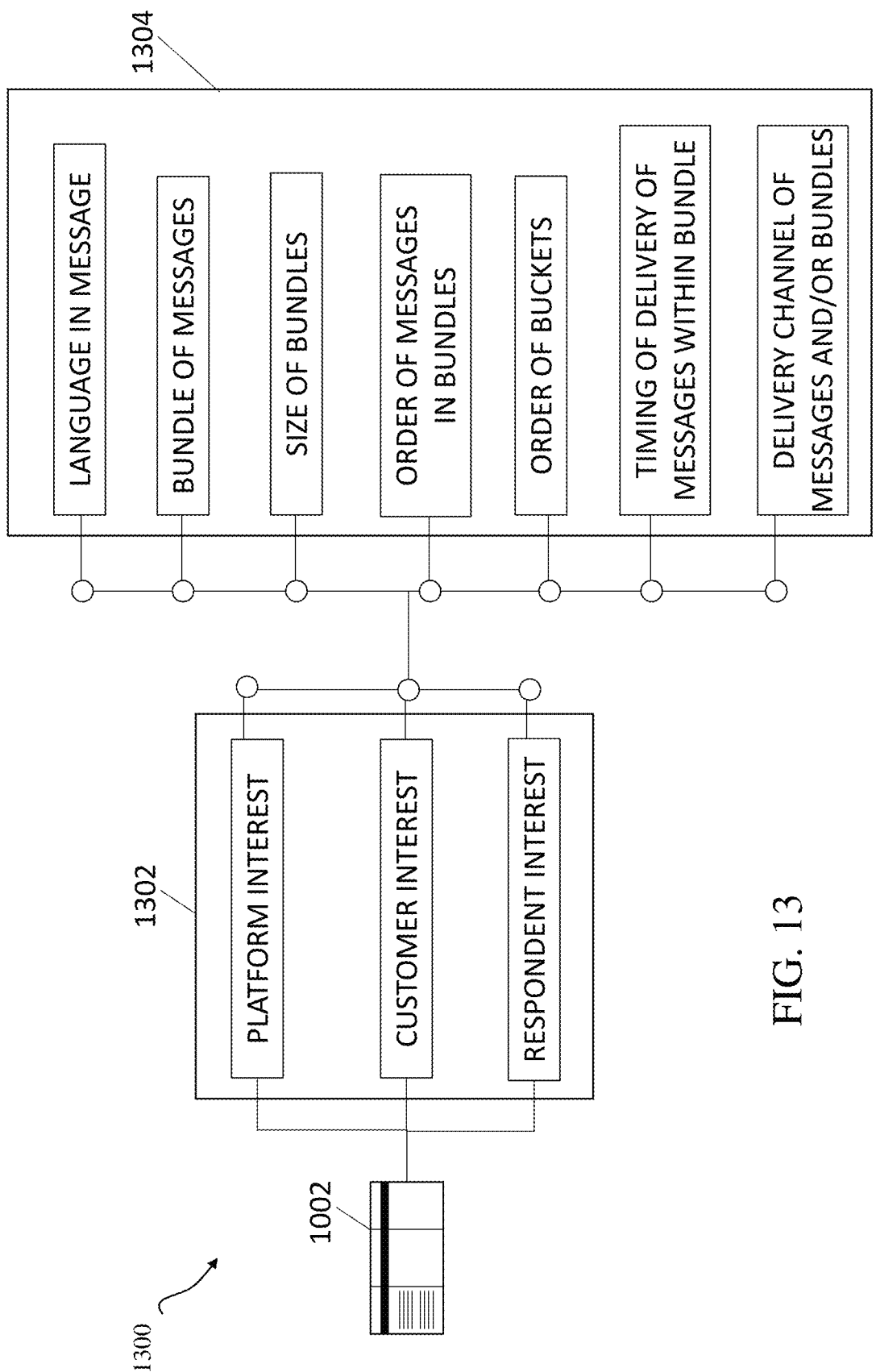
FIG. 13 is a block diagram illustrating example modules that can be executed by or in conjunction with one or more information processors.

FIG. 13 is a block diagram illustrating example modules 1300 that can be executed by or in conjunction with information processor 902. For example, interests section 1302 include various motivations for various features and aspects of the present disclosure, and include platform interests, customer interests, and respondent interests. Platform interests can include motivations for a proprietor of the present disclosure, such as a company that provides messaging technology shown and described herein. For example, platform interests can include commercial interests (e.g., related to sponsors), or other interests of proprietors of the present disclosure, such as relating to efficiency, cost, and accuracy. Interests section 1302 can also include customer interests that are attributable to a customer of a proprietor of the present disclosure, such as a brand that desires to ensure that optimal message(s) are provided to instill action (e.g., to purchase the brand's product). Additionally, interests section 1302 can include respondent interests, which can be interests directly attributable to a respondent who is provided messages, such as with regard to time expediency, accuracy, or supporting one or more other respective heuristics particular to a respondent.

Depending on respective motivating interests (e.g., proprietor's, customer's, or respondent's), various actions can be taken to ensure optimal messages and/or message bundles. For example, action section 1304 includes generation and/or modification steps, including generating/modifying message language, message bundles, bundle size, message order in bundles, order of buckets of messages, timing of delivery of messages within a bundle, and delivery channel(s) associated with messages and/or message bundles.

Figure 14:
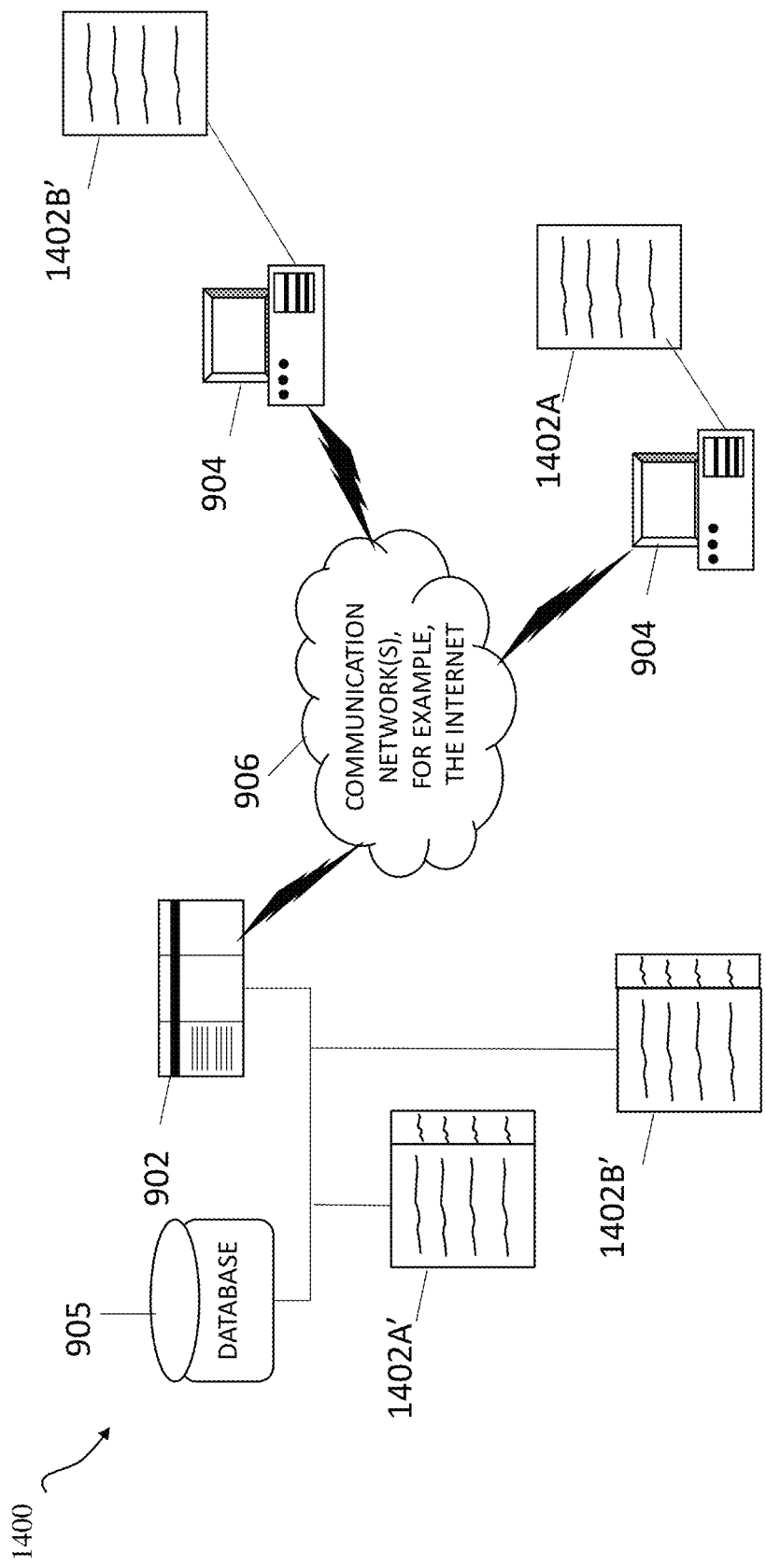
FIGS. 14 and 15 are block diagrams of a system in which one or more information processors operate to receive and process messages, in accordance with one or more implementations of the present disclosure.
Figure 15:
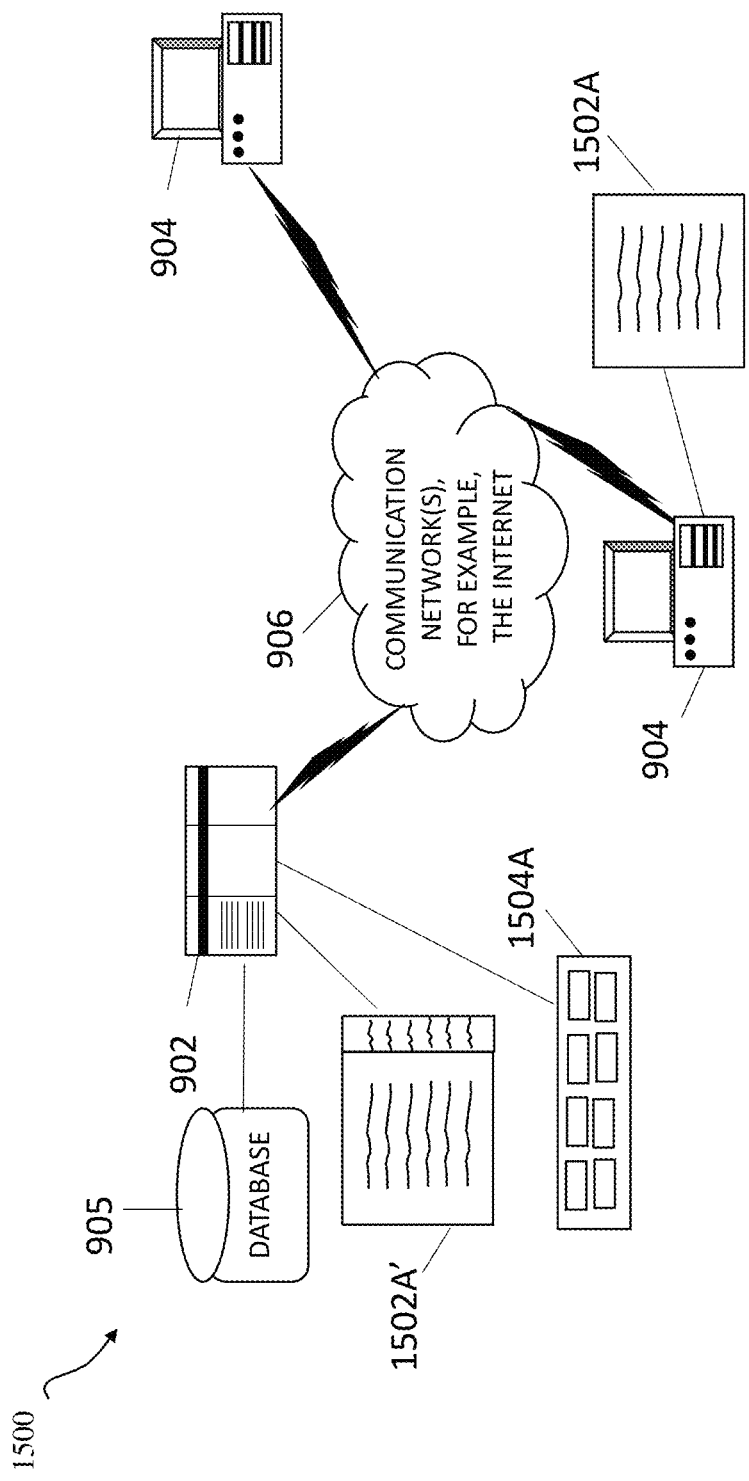

FIGS. 14 and 15 are block diagrams illustrating example implementations of system 900 in which information processor 902 operates to receive and process messages 1402 (e.g., 1402A and 1402B) respectively from user computing devices 904. Information processor 902 processes the messages as shown and described herein, including to modify and add messages, to generate message bundles, and to annotate messages, such as by adding attributes, metadata, and/or other suitable information. As illustrated in FIG. 14, messages 1402 that are received from user computing devices 904 that are transformed are represented as 1402'

(e.g., 1402A' and 1402B'). Various transformations can include modifying message language, message bundles, bundle sizes, and ordering of messages in message bundles. As shown in FIG. 15, messages 1502A and/or 1502A' are included in message bundle 1502A. In accordance with the teachings herein, messages 1502A' and 1502B' and message bundle 1502A can be transmitted from information processor 902 to respective user computing devices 904 for further use.

Figure 16:
FIG. 16 shows an example graphic display screen that illustrates options associated with generating optimal message bundles in accordance with an implementation of the present disclosure.

FIG. 16 shows an example graphic display screen 1600 that illustrates options associated with generating optimal message bundles in accordance with an implementation of the present disclosure. In the example display screen 1600, four tab options 1602 are provided for defining strategic bundles, executional bundles, tactical bundles, and custom bundles. The strategic bundles choice in tab options 1602 represents messages bundles that are optimized to guide the overall messaging strategy across channels. Executional bundles represent message bundles optimized for omnichannel messaging needs, that is the most optimal bundles for each respective channel. Tactical bundles option provide optimized message bundles in view of offense/defense tactical strategies in view of respective competitors. Additionally, custom bundles option provides message bundles based on user-customized specific needs. Additionally, and as illustrated in detail section 1604, which can be filtered as a function of various subgroups, columns are provided for providing additional information, such as regarding details associated with specific message bundles. For example, message bundle names, generation status (e.g., complete, in progress, pending, etc.), rules/description (representing a description of the respective message bundles and/or rules for defining the message bundles), and numbers of messages in custom message bundles to account for specific customer needs can be provided in detail section 1604. Other information is provided in detail section 1604 shown in FIG. 16 includes preference share percentage value, results and visibility checkbox. In one or more implementations, results are provided to enable users to download the bundle, such as in a presentation (e.g., MS-POWERPOINT) file. Visibility allows one or more analysts to decide which bundles clients should see or not. The analyst may run, for example, many different kinds of bundles as part of the analysis process, but then later decide that the client should or should not need to see all of them.

Below is a brief description associated with respective methodology in accordance with an example implementation.

Prior to conducting research, an inventory of messages, such as 50 to 200 messages, is received from computing device operated by a client of a proprietor of the present disclosure. The messages are designed to target a specific type of customer of the client, e.g., a physician who treats patients in a specific disease state. Each message includes eight to ten attributes, such as clinical efficacy, safety, mechanism of action, or the like. The messages are processed using a simulation algorithm and a number of dominant decision heuristics, such as 20, driving the kinds of decisions the physician makes while treating patients. For example, any heuristic associated with each original message can be reversed engineered, such as by a computing device executing a machine learning predictive algorithm using language construction in the message.

Thereafter, alternate versions of at least some of the originally received messages are generated to include language that addresses a particular heuristic. The alternative versions are determined to be more effective with regard to the respectively identified heuristics. The alternate versions of the messages, referred to herein, generally as heuristicized messages, are also added to the inventory. Thereafter, the messages are provided to respondents for research purposes, such as in one or more surveys that include heuristicized messages. The respondents spend a period of time, e.g., 30 minutes, responding to the survey such as by answering questions or making choices.

The dominant heuristics that were identified can be used further during a research phase. For each respondent, for example, a hierarchy of heuristics (e.g., 1 to 20) is determined. Respondents, such as the physician in the above example, are provided number of randomly displayed messages, such as 4, that include messages from the original inventory and heuristicized messages. Respondents are prompted to select the most and least preferred messages from the choice set. They see a number of sets of messages, such as 16, and each set includes a number of messages, such as 4 messages. Thus, in the present example, equals 64 unique messages. Of course, many more messages could be provided, such as in an instance in which 60 original messages were received and 60 heuristicized messages are added to it, providing a 120 unique messages in the inventory.

It is recognized herein that it can be impractical (or impossible) for all respondents to respond to all messages in an inventory and heuristicized messages generated in accordance with the teachings herein. Accordingly, a limited number of heuristics can be identified that are associated with all of the messages, which can result in an effective subset of messages to provide in a survey. Further, heuristics can be scored substantially in real-time, thereby enabling a fewer selection of respective messages based on the highest performing heuristics to provide to the respondents. Accordingly, messages are presented in various sets per a design of experiments that capture the heuristic preferences of each respondent in the future.

In one or more implementations of the present disclosure, data that are obtained during the research phase described herein are processed to generate a composite score for each heuristic for each respondent substantially in real-time. Starting with the highest scoring heuristic, messages are shortlisted in accordance with each attribute for each respondent. For example with regard to a particular medication, if a heuristic representing loss aversion is ranked as the highest scoring heuristic and there are a number of messages (e.g., 8 messages) written to loss aversion (4 in efficacy, 3 in mechanism of action (e.g., how the medication works), 1 in safety) then those messages are selected for presentation first. Alternatively, if too many messages are available for any given heuristic, data beyond the heuristic(s) associated with the respondent can be considered, such as data associated with one or more other participating respondents. A shortlist of messages can be generated for each respondent substantially in real-time, based on how the respondent makes treatment decisions using heuristics, such as in the respective disease state.

Using each respondent's shortlist of messages, message bundles can be created that contain a number of messages, such as 6-10, per bundle. Respondents go through another choice exercise in which they see a number of bundles, such as 2 bundles, and the respondents choose the most motivating bundle of the number. The respondents further go through a number of choice sets, such as 16-20, with a small number of bundles, such as 2, in each choice set. It is to be appreciated that the total number of bundles that can be mathematically generated, even with a short list of messages, is often in the millions and, therefore, all possible bundles practically cannot be tested. It is recognized, however, that as long as enough respondents see some bundles based on a design of experiments, then the data collected across all respondents can be used to predict scores for untested bundles.

Thus, as shown and described herein, machine learning algorithms are used by a at least one computing device to analyze each received message in an inventory of messages, and to write an alternative form of each message. Messages are customized and bundles of the messages are generated and provided for each respondent, based on the respondent's individual heuristics. Thereafter, and as shown and described herein, genetic algorithms are used to identify optimal message bundles out of potentially billions of combinations of messages. Optimal bundles of messages guide client's overall messaging strategy across channels. For example, rules can be specified to identify a total number of messages in an optimal message bundle, to identify a range of messages by attribute, to identify messages or types of messages to be excluded from a message bundle, and to identify a sub-group or segment of messages. Furthermore, one or more instructions can be executed by a computing device to display messages included in an optimal message bundle, as well as the contribution of each message to preference share of the optimal message bundle. Messages can be dropped from bundle or substituted with another message for users to check a message's relative impact on preference share.

Figure 17:
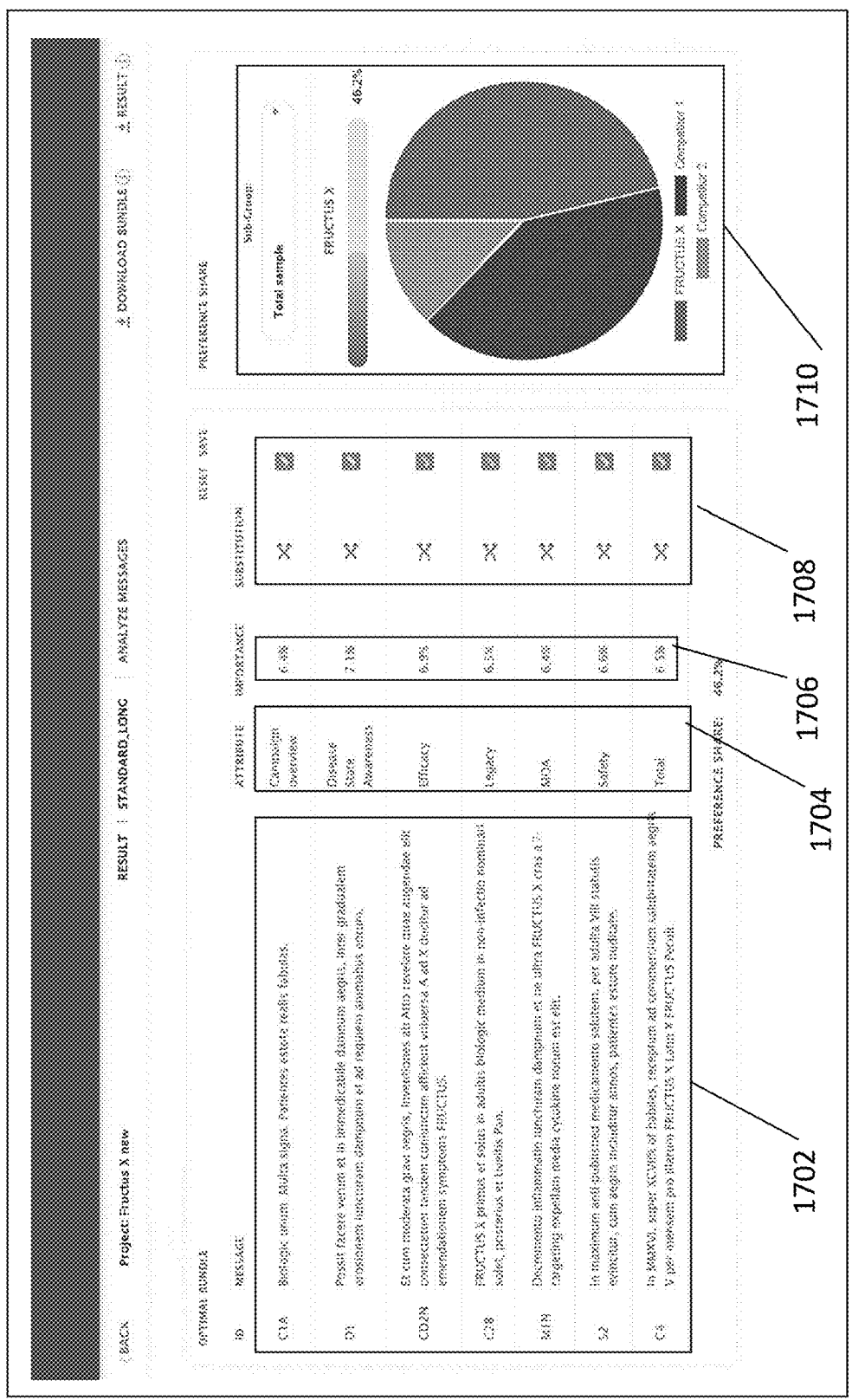
FIG. 17 shows an example graphic display screen that includes details, attributes, percentage values representing relative importance of a message in a bundle, graphical screen controls for selecting respective messages that can be substituted from the message bundle, and a pie chart graph identifying a relative preference share.

An example display screen 1700 is illustrated in FIG. 17 that shows details section 1702 (showing message content and corresponding database identifier), attributes section 1704, importance section 1706 (showing percentage values representing relative importance of the message in the bundle), substitution section 1708 (including graphical screen controls for selecting respective messages that can be substituted from the message bundle), and preference share section 1710, including a pie chart graph identifying the relative preference share that displays the customer's product percentage relative to a competitor's. The pie chart graph in FIG. 17 represents example preference share for respective brands, such as a client's brand and competitors of the client. As used herein, preference share is a term that has similar meaning as market share. In the research basket of messages associated with a number (e.g., 6) brands is tested, including for a respective client. Some other brands in the overall market may be excluded, such as for not that being relevant enough to a respective client, being generic, or too old, or the like. The total preference share shares total up to 100% across the brands tested in research, are respectively represented in the pie chart graph.

Figure 18:
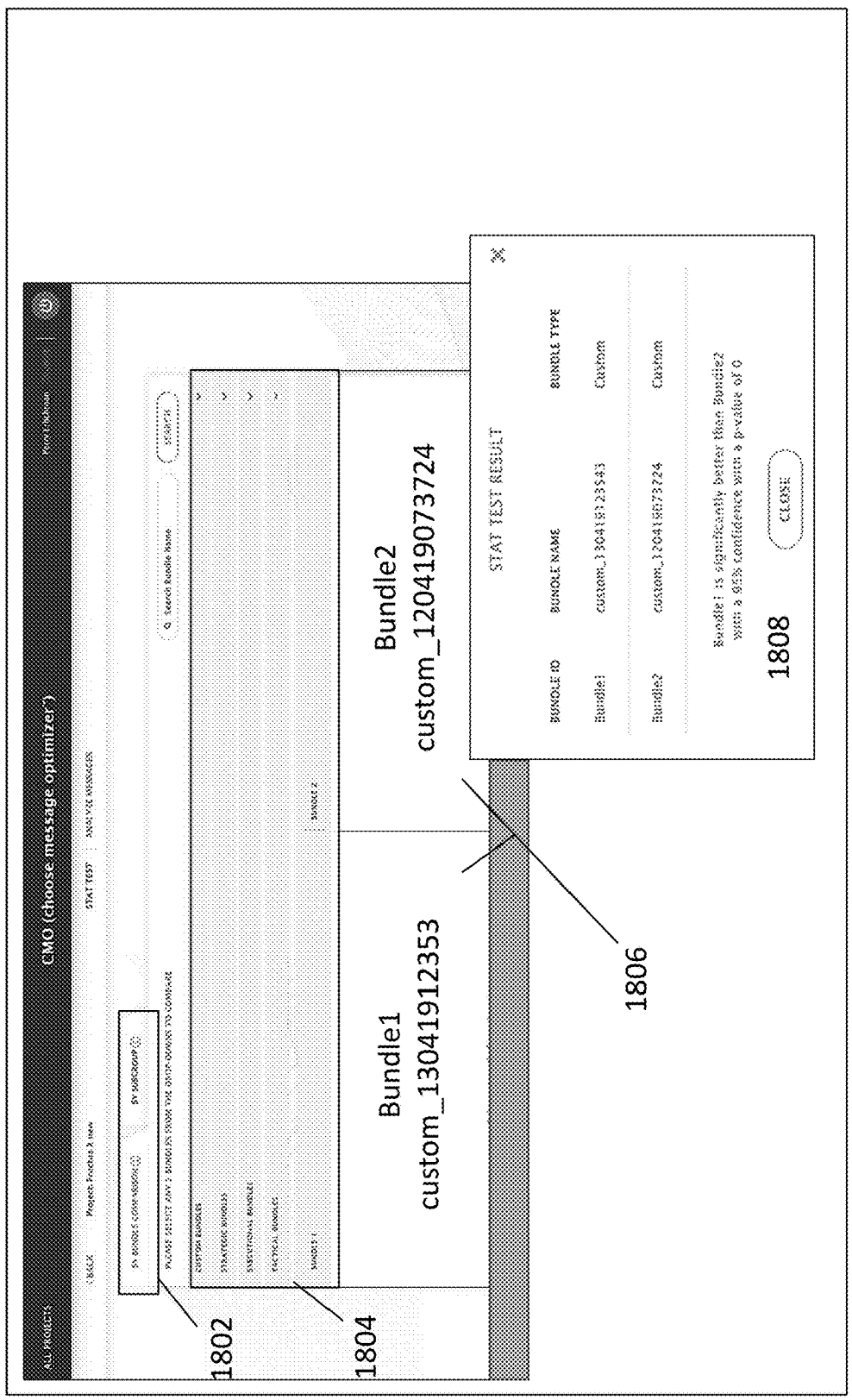
FIG. 18 illustrates an example graphic display screen in which two bundles have been selected and showing results of statistical significance testing with regard to the two bundles.

An example graphic display screen 1800 is illustrated in FIG. 18, in which two bundles have been selected and statistical significance testing has been run to determine whether the two bundles are meaningfully different from each other. As shown in FIG. 18, selection tabs 1802 provide options for comparing by bundle or by subgroup. In the example shown in FIG. 18, message bundle selection section 1804 provide selectable drop-down lists for a user to select two message bundles. Options for selections of message bundles include predefined message types, such as custom bundles, strategic bundles, executional bundles, and tactical bundles. In the example shown in FIG. 18, selected message bundles in section 1806 indicate that two custom message bundles (illustrated as Bundle1 and Bundle2) have been selected. Pop-up window 1808 shows that Bundle1 is significantly better than Bundle2, with a 95% confidence.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Moreover, while certain examples and descriptions herein refer to operations performed by an information processor 902 and/or a user computing device 904, it is to be understood that the present disclosure supports distributed techniques. Accordingly, any of the operations shown and described herein can be executed by an information processor 902, a computing device 904, or a combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Thus, the subject matter described above is provided by way of illustration only and should not be construed as limiting. Various modifications and changes can be made to the subject matter described herein without following the example embodiments and applications illustrated and described, and without departing from the true spirit and scope of the present invention.

What is claimed:

1. A method, comprising:
   receiving, from a user computing device by at least one information processor configured by executing code stored on non-transitory processor readable media, a plurality of messages;
   for each respective one of the received plurality of messages:
      identifying, by the at least one information processor, language in the respective message;
      determining, by the at least one information processor as a function of the identified language, at least one heuristic associated with the respective message;
      generating, by the at least one information processor as a function of the at least one heuristic associated with the respective message, a first modified version of the respective message, wherein the first modified version includes language that is not in the respective message, and further wherein the first modified version represents the at least one heuristic associated with the respective message; and
      generating, by the at least one information processor as a function of at least one other heuristic, at least one second modified version of the respective message, wherein the at least one second modified version includes language not in the respective message and not in the first modified version of the respective message, and further wherein the at least one second modified version represents the determined at least one other heuristic;
   prompting, by the at least one information processor, a computing device operated by a respondent to respond to a first survey of a plurality messages, wherein the first survey includes at least one of respective messages, at least one first modified version of the respective messages, at least one second modified version of the respective messages, or any combination thereof, and further wherein each determined heuristic associated with the received plurality of messages is represented in the first survey;
   receiving, by the at least one information processor from the computing device operated by the respondent, responses to each of the messages in the first survey;
   determining, by the at least one information processor as a function of the responses, at least one heuristic associated with the respondent;
   generating, by the at least one information processor, a second survey that includes at least one of respective messages, at least one first modified version of the respective messages, at least one second modified version of the respective messages, or any combination thereof, wherein each of the messages in the second survey is associated with the at least one heuristic associated with the respondent; and
   providing, by the at least one information processor, the second survey to the computing device operated by the respondent.

2. The method of claim 1, wherein each heuristic associated with the respective message and the respondent is determined by the at least one information processor using artificial intelligence.

3. The method of claim 1, further comprising:
   identifying, by the at least one information processor, at least one message for inclusion in the second survey by executing a genetic algorithm.

4. The method of claim 1, wherein the second survey includes a bundle of messages, and further comprising:
   generating, by the at least one information processor, the bundle of messages as a function of cross-breeding.

5. The method of claim 1, further comprising:
   generating, by the at least one processor, a bundle of messages that includes at least one of respective messages, at least one first modified version of the respective messages, at least one second modified version of the respective messages, or any combination thereof, wherein each of the messages in the bundle of messages is associated with the at least one heuristic associated with the respondent;
   transmitting, by the at least one processor, the bundle of messages to a computing device;
   receiving, from the computing device, a modified version of the bundle;
   processing, by the at least one processor, the modified version of the bundle to determine whether the modified version of the bundle is as effective, more effective, or less effective than the bundle of messages; and
   transmitting, by the at least one information processor to the computing device, information representing results of the determination.

6. The method of claim 1, further comprising:
   determining, by the at least one information processor, a contribution of each respective message in the second survey to a preference share.

7. The method of claim 1, further comprising:
   processing, by the at least one processor, the received responses to each of the messages in the first survey to determine a selection of the respective messages, the first modified versions of the respective messages, and the second modified versions of the respective messages by assigning a score to each of the messages and selecting messages having an assigned score above a minimum threshold value;
   wherein the selection of messages is provided in the second survey.

8. The method of claim 1, wherein the first survey includes individual messages and the second survey includes bundles of messages.

9. A system comprising: at least one processor configured to interact with a computer readable medium in order to perform operations comprising:
   receiving, from a user computing device by at least one information processor configured by executing code stored on non-transitory processor readable media, a plurality of messages;
   for each respective one of the received plurality of messages:
      identifying, by the at least one information processor, language in the respective message;
      determining, by the at least one information processor as a function of the identified language, at least one heuristic associated with the respective message;
      generating, by the at least one information processor as a function of the at least one heuristic associated with the respective message, a first modified version of the respective message, wherein the first modified version includes language that is not in the respective message, and further wherein the first modified version represents the at least one heuristic associated with the respective message; and
      generating, by the at least one information processor as a function of at least one other heuristic, at least one second modified version of the respective message, wherein the at least one second modified version includes language not in the respective message and not in the first modified version of the respective message, and further wherein the at least one second modified version represents the determined at least one other heuristic;

prompting, by the at least one information processor, a computing device operated by a respondent to respond to a first survey of a plurality messages, wherein the first survey includes at least one of respective messages, at least one first modified version of the respective messages, at least one second modified version of the respective messages, or any combination thereof, and further wherein each determined heuristic associated with the received plurality of messages is represented in the first survey;

receiving, by the at least one information processor from the computing device operated by the respondent, responses to each of the messages in the first survey;

determining, by the at least one information processor as a function of the responses, at least one heuristic associated with the respondent;

generating, by the at least one information processor, a second survey that includes at least one of respective messages, at least one first modified version of the respective messages, at least one second modified version of the respective messages, or any combination thereof, wherein each of the messages in the second survey is associated with the at least one heuristic associated with the respondent; and providing, by the at least one information processor, the second survey to the computing device operated by the respondent.

10. The system of claim 9, wherein each heuristic associated with the respective message and the respondent is determined by the at least one information processor using artificial intelligence.

11. The system of claim 9, wherein the at least one processor is further configured to interact with a computer readable medium in order to perform operations comprising:
identifying, by the at least one information processor, at least one message for inclusion in the second survey by executing a genetic algorithm.

12. The system of claim 9, wherein the second survey includes a bundle of messages, and further wherein the at least one processor is further configured to interact with a computer readable medium in order to perform operations comprising:

generating, by the at least one information processor, the bundle of messages as a function of cross-breeding.

13. The system of claim 9, wherein the at least one processor is further configured to interact with a computer readable medium in order to perform operations comprising:
generating, by the at least one processor, a bundle of messages that includes at least one of respective messages, at least one first modified version of the respective messages, at least one second modified version of the respective messages, or any combination thereof, wherein each of the messages in the bundle of messages is associated with the at least one heuristic associated with the respondent;
transmitting, by the at least one processor, the bundle of messages to a computing device;
receiving, from the computing device, a modified version of the bundle;
processing, by the at least one processor, the modified version of the bundle to determine whether the modified version of the bundle is as effective, more effective, or less effective than the bundle of messages; and
transmitting, by the at least one information processor to the computing device, information representing results of the determination.

14. The system of claim 9, wherein the at least one processor is further configured to interact with a computer readable medium in order to perform operations comprising:
determining, by the at least one information processor, a contribution of each respective message in the second survey to a preference share.

15. The system of claim 9, wherein the at least one processor is further configured to interact with a computer readable medium in order to perform operations comprising:
processing, by the at least one processor, the received responses to each of the messages in the first survey to determine a selection of the respective messages, the first modified versions of the respective messages, and the second modified versions of the respective messages by assigning a score to each of the messages and selecting messages having an assigned score above a minimum threshold value;
wherein the selection of messages is provided in the second survey.

16. The system of claim 9, wherein the first survey includes individual messages and the second survey includes bundles of messages.

* * * * *